United States Patent
Mori et al.

(10) Patent No.: US 6,691,313 B2
(45) Date of Patent: Feb. 10, 2004

(54) TERMINAL APPARATUS AND METHOD FOR ACHIEVING INTERACTIVE OPERATIONS BY DISPLAYING A DESIRED PIECE OF IMAGE INFORMATION AT HIGH SPEED USING CACHE MEMORIES, OUT OF A LARGE AMOUNT OF IMAGE INFORMATION SENT IN A ONE-WAY DIRECTION

(75) Inventors: Toshiya Mori, Settsu (JP); Naoya Takao, Kadoma (JP); Tatsuya Shimoji, Neyagawa (JP); Kazuo Okamura, Hirakata (JP); Junichi Hirai, Suita (JP); Masahiro Oashi, Hirakata (JP); Takashi Kakiuchi, Toyonaka (JP); Yuki Kusumi, Kashiba (JP); Yoshiyuki Miyabe, Osaka (JP); Ikuo Minakata, Kyoto-fu (JP); Masayuki Kozuka, Neyagawa (JP); Yoshihiro Mimura, Hirakata (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 533 days.

(21) Appl. No.: 09/783,421

(22) Filed: Feb. 14, 2001

(65) Prior Publication Data

US 2002/0056096 A1 May 9, 2002

Related U.S. Application Data

(63) Continuation of application No. 08/920,992, filed on Aug. 29, 1997, now Pat. No. 6,191,782.

(51) Int. Cl.$^7$ ............... H04N 7/173; H04N 5/445; G06F 3/00; G06F 13/00
(52) U.S. Cl. ................. 725/112; 725/51
(58) Field of Search ............... 725/51, 52, 37, 725/112, 136; H04N 7/173, 5/445; G06F 3/00, 13/00

(56) References Cited

U.S. PATENT DOCUMENTS

| | | | |
|---|---|---|---|
| 5,521,943 A | | 5/1996 | Dambacher |
| 5,541,662 A | | 7/1996 | Adams et al. |
| 5,559,808 A | | 9/1996 | Kostreski et al. |
| 6,018,768 A | * | 1/2000 | Ullman et al. ............ 709/218 |
| 6,163,803 A | * | 12/2000 | Watanabe ............ 709/217 |
| 6,169,541 B1 | * | 1/2001 | Smith ............ 345/327 |

FOREIGN PATENT DOCUMENTS

| | | |
|---|---|---|
| EP | 477786 | 4/1992 |
| GB | 2272616 | 5/1994 |
| JP | 5252123 | 9/1993 |
| JP | 6296267 | 10/1994 |

OTHER PUBLICATIONS

"MHEG" Explained, by T. Meyer–Boudnik et al., 8840 IEEE Multimedia, 2 (1995), Spring, No. 1.

"Using Predictive Prefetching to Improve World Wide Web Latency," by V. Padmanabhathi et al., Computer Communications Review, vol. 26, No. 3, Jul. 1, 1996.

(List continued on next page.)

Primary Examiner—Vivek Srivastava

(57) ABSTRACT

A terminal apparatus for interactively switching pieces of presentation data in a system which repeatedly broadcasts pieces of presentation data and corresponding pieces of navigation data including a receiver for receiving the presentation data, a reproduction apparatus, and a cache storage for storing pre-received pieces of presentation data and navigation data. Navigation data is analyzed to detect pieces of link-target presentation data which are presented to an operator. When the operator selects one of the link-target presentation data stored in the cache storage, the reproduction apparatus reproduces the presentation data.

58 Claims, 36 Drawing Sheets

OTHER PUBLICATIONS

"Extended Service for ISDB Television," ITE Technical Report vol. 18, No. 21, pp. 19–24, BCS'94–10 (Mar. 1994).

"Multimedia Services Through Broadcasting," Proceedings of the 1994 IEICE Fall Conference, 1994.

"Basic Functions of Multimedia Information Broadcasting Service,"Journal of ITE, vol. 49, No. 3, pp. 336–343, 1995.

"Navigation Methods in Multimedia Information Broadcasting Services," IPSJ SIG Notes vol. 95, No. 90, pp. 9–16, Sep. 14, 1995.

* cited by examiner

NARRATION INCLUDED IN AUDIO ELEMENT[1] (PID=0x0601)
INTRODUCING INTERACTIVE CHANNEL.
THANK YOU FOR SELECTING THE 'A' BROADCAST.
FOR TODAY'S BROADCAST,WE WILL BE SHOWING
THE FOLLOWING PROGRAMS. WE ARE SURE YOU
WILL ENJOY THEM.

MOTION PICTURE INCLUDED IN VIDEO ELEMENT[1](PID=0X202)
SHOT OF A BROADCASTING COMPANY ANNOUNCER(120 SECONDS)

FIRST FRAME(00:00:00.00SEC)

NARRATION INCLUDED IN AUDIO ELEMENT[2](PID=0x0602)

NEW MOVIE INFORMATION.
COMING UP SOON AT THEATERS IN OSAKA.

MOTION PICTURE INCLUDED IN VIDEO ELEMENT[2](PID=0X302)
PREVIEW OF NEW MOVIES(360 SECONDS)

FIRST FRAME(00:00:00.00SEC)

NARRATION INCLUDED IN AUDIO ELEMENT[43]

INTRODUCING THE CAST OF "THE TERROR OF THE HUGE TORNADO" (DISTRIBUTED BY AAA COMPANY).
PLEASE SELECT AN ACTOR/ACTRESS.

MOTION PICTURE INCLUDED IN VIDEO ELEMENT[43]
SHOTS OF THE MAIN CAST OF "THE TERROR OF THE HUGE TORNADO" DISTRIBUTED BY AAA COMPANY

FIG. 3

NVT[1]

Object Definition Table

| Index | type | X-coordinate | Y-coordinate | HANDLER | Normal_Bitmap | Forcused_Bitmap |
|---|---|---|---|---|---|---|
| 1 | Button | 50 | 50 | HD_Index[1] | bitmap1 | bitmap101 |
| 2 | Button | 100 | 50 | HD_Index[2] | bitmap2 | bitmap102 |
| 3 | Button | 50 | 100 | HD_Index[3] | bitmap3 | bitmap103 |
| 4 | Button | 100 | 100 | HD_Index[4] | bitmap4 | bitmap104 |

302

Handler Definition Table  303

| HD_Index | Script |
|---|---|
| 1 | goto_content(HL_index1) |
| 2 | goto_content(HL_index2) |
| 3 | goto_content(HL_index3) |
| 4 | goto_content(HL_index4) |

Hyperlink Table  304

| HL_Index | orig_nw_id | ts_id | VE_svc_id | VE_event_id | VE_comp_tag | AC_svc_id | AE_event_id | AE_comp_tag | NE_svc_id | NE_event_id | NE_id_EXT | rank |
|---|---|---|---|---|---|---|---|---|---|---|---|---|
| 1 | – | – | – | – | 0x0002 | – | – | 0x0102 | – | – | 0x0002 | 1 |
| 2 | – | – | – | – | 0x0003 | – | – | 0x0103 | – | – | 0x0003 | 2 |
| 3 | – | – | – | – | 0x0004 | – | – | 0x0104 | – | – | 0x0004 | 3 |
| 4 | – | – | – | – | 0x0005 | – | – | 0x0105 | – | – | 0x0005 | 4 |

Bitmap Table  301 bitmap1: (NEW MOVIE INFORMATION)
bitmap2: (INTERNET LATEST INFORMATION)
bitmap3: (EVENT INFORMATION)
bitmap4: (PROGRAM PREVIEW)

bitmap101: (NEW MOVIE INFORMATION)
bitmap102: (INTERNET LATEST INFORMATION)
bitmap103: (EVENT INFORMATION)
bitmap104: (PROGRAM PREVIEW)

FIG. 4

NVT[2]

Object Definition Table

| Index | type | X-coordinate | Y-coordinate | HANDLER | Normal_Bitmap | Forcused_Bitmap |
|---|---|---|---|---|---|---|
| 1 | Button | 75 | 50 | HD_Index[1] | bitmap1 | bitmap105 |
| 2 | Button | 125 | 50 | HD_Index[2] | bitmap2 | bitmap106 |
| 3 | Button | 100 | 100 | HD_Index[3] | bitmap3 | bitmap107 |
| 4 | Button | 150 | 120 | HD_Index[4] | bitmap4 | bitmap108 |

Handler Definition Table

| HD_Index | Script |
|---|---|
| 1 | goto_content(HL_index1) |
| 2 | goto_content(HL_index2) |
| 3 | goto_content(HL_index3) |
| 4 | goto_content(HL_index4) |

Hyperlink Table

| HL_Index | orig_nw_id | ts_id | VE_svc_id | VE_event_id | VE_comp_tag | AC_svc_id | AE_event_id | AE_comp_tag | NE_svc_id | NE_event_id | NE_id_EXT | rank |
|---|---|---|---|---|---|---|---|---|---|---|---|---|
| 1 | - | - | - | - | 0x0011 | - | - | 0x00111 | - | - | 0x0011 | 1 |
| 2 | - | - | - | - | 0x0012 | - | - | 0x00112 | - | - | 0x0012 | 2 |
| 3 | - | - | - | - | 0x0021 | - | - | 0x00121 | - | - | 0x0021 | 3 |
| 4 | - | - | - | - | 0x0001 | - | - | 0x00101 | - | - | 0x0001 | 4 |

Bitmap Table bitmap5
(THE TERROR OF THE HUGE TORNADO (DISTRIBUTED BY AAA COMPANY))

bitmap6
(THE RETURN OF THE MONSTROUS DINOSAURS(DISTRIBUTED BY BBB COMPANY))

bitmap7
(SPORTS WARS(DISTRIBUTED BY AAA COMPANY))

bitmap8
(RETURN)

bitmap105
(THE TERROR OF THE HUGE TORNADO (DISTRIBUTED BY AAA COMPANY))

bitmap106
(THE RETURN OF THE MONSTROUS DINOSAURS(DISTRIBUTED BY BBB COMPANY))

bitmap107
(SPORTS WARS(DISTRIBUTED BY AAA COMPANY))

bitmap108
(RETURN)

FIG. 5

NVT[12]

Object Definition Table

| Index | type | X-coordinate | Y-coordinate | HANDLER | Normal_Bitmap | Forcused_Bitmap |
|---|---|---|---|---|---|---|
| 1 | Button | 25 | 25 | HD_Index[1] | bitmap41 | bitmap141 |
| 2 | Button | 75 | 25 | HD_Index[2] | bitmap42 | bitmap142 |
| 3 | Button | 25 | 50 | HD_Index[3] | bitmap43 | bitmap143 |
| 4 | Button | 75 | 50 | HD_Index[4] | bitmap44 | bitmap144 |
| 5 | Button | 25 | 75 | HD_Index[5] | bitmap45 | bitmap145 |
| 6 | Button | 25 | 100 | HD_Index[6] | bitmap46 | bitmap146 |
| 7 | Button | 75 | 100 | HD_Index[7] | bitmap47 | bitmap147 |
| 8 | Button | 25 | 125 | HD_Index[8] | bitmap48 | bitmap148 |
| 9 | Button | 75 | 125 | HD_Index[9] | bitmap49 | bitmap149 |
| 10 | Button | 100 | 125 | HD_Index[10] | bitmap50 | bitmap150 |

Handler Definition Table

| HD_Index | Script |
|---|---|
| 1 | goto_content(HL_index1) |
| 2 | goto_content(HL_index2) |
| 3 | goto_content(HL_index3) |
| 4 | goto_content(HL_index4) |

Hyperlink Table

| HL_Index | orig_nw_id | ts_id | VE_svc_id | VE_event_id | VE_comp_tag | AC_svc_id | AE_event_id | AE_comp_tag | NE_svc_id | NE_event_id | NE_id_EXT | rank |
|---|---|---|---|---|---|---|---|---|---|---|---|---|
| 1 | — | — | — | — | 0x0041 | — | — | 0x0141 | — | — | 0x0041 | 7 |
| 2 | — | — | — | — | 0x0042 | — | — | 0x0142 | — | — | 0x0042 | 6 |
| 3 | — | — | — | — | 0x0043 | — | — | 0x0143 | — | — | 0x0043 | 4 |
| 4 | — | — | — | — | 0x0044 | — | — | 0x0144 | — | — | 0x0044 | 5 |
| 5 | — | — | — | — | 0x0045 | — | — | 0x0145 | — | — | 0x0045 | 1 |
| 6 | — | — | — | — | 0x0046 | — | — | 0x0146 | — | — | 0x0046 | 3 |
| 7 | — | — | — | — | 0x0047 | — | — | 0x0147 | — | — | 0x0047 | 2 |
| 8 | — | — | — | — | 0x0048 | — | — | 0x0148 | — | — | 0x0048 | 8 |
| 9 | — | — | — | — | 0x0049 | — | — | 0x0149 | — | — | 0x0049 | 9 |
| 10 | — | — | — | — | 0x0050 | — | — | 0x0150 | — | — | 0x0050 | 10 |

Bitmap Table

Bitmap41 ( OPENING )  Bitmap43 ( ENTRANCE OF THE ENTIRE CAST )

Bitmap45 ( WHOLE TOWN IN PANIC )  Bitmap46 ( WEATHER REPORT )

Bitmap48 ( CLIMAX )  Bitmap42 ( STORM IN X STATE )

Bitmap44 ( WEATHER REPORT )  Bitmap47 ( THE BIGGEST TORNADO IN HISTORY DEVELOPS )

Bitmap49 ( ENDING )  Bitmap50 ( RETURN )

FIG. 6

Program Map Table table_id=0x02

⋮ program_number=0x0001

PCR_PID=0x0081

⋮

| PID | stream_type | descriptor | |
|---|---|---|---|
| 0x0302 | — | stream_identifier_descritor | component_tag0x0002 |
| 0x0303 | — | stream_identifier_descritor | component_tag0x0003 |
| 0x0304 | — | stream_identifier_descritor | component_tag0x0004 |
| 0x0305 | — | stream_identifier_descritor | component_tag0x0005 |
| ⋮ | ⋮ | ⋮ | ⋮ |
| 0x0401 | — | stream_identifier_descritor | component_tag0x0011 |
| 0x0402 | — | stream_identifier_descritor | component_tag0x0012 |
| 0x0403 | — | stream_identifier_descritor | component_tag0x0021 |
| ⋮ | ⋮ | ⋮ | ⋮ |
| 0x0601 | — | stream_identifier_descritor | component_tag0x0101 |
| 0x0602 | — | stream_identifier_descritor | component_tag0x0102 |
| 0x0603 | — | stream_identifier_descritor | component_tag0x0103 |
| 0x0604 | — | stream_identifier_descritor | component_tag0x0104 |
| 0x0605 | — | stream_identifier_descritor | component_tag0x0105 |
| 0x0606 | — | stream_identifier_descritor | component_tag0x0106 |

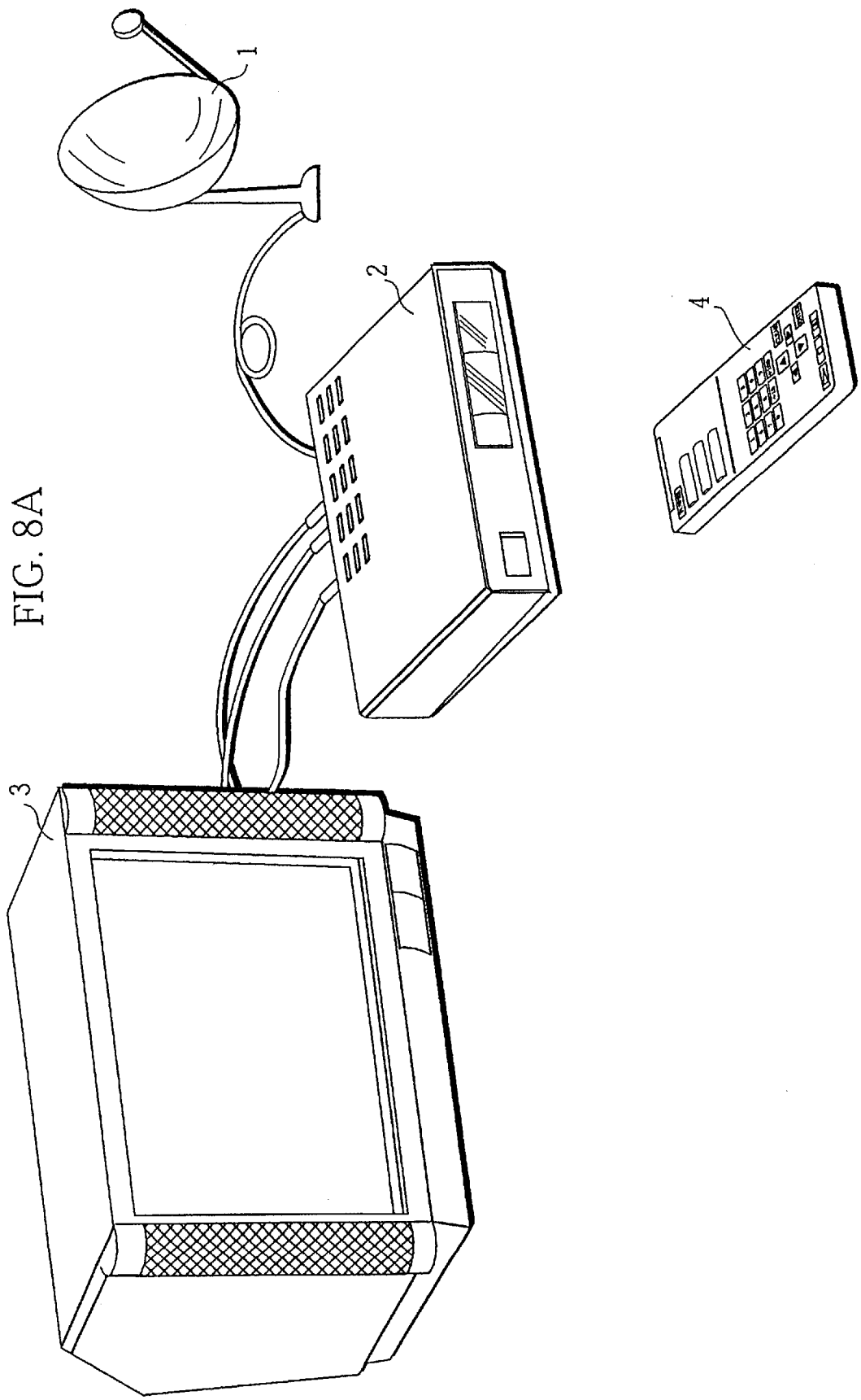

FIG. 10A NAVIGATION CACHE UNIT

|   | NVT | DISPLAY HISTORY MARK |
|---|---|---|
| 1 | NVT[1] | ●HIT |
| 2 | NVT[2] | NOT JUDGED |
| 3 | NVT[3] | NOT JUDGED |
| 4 | NVT[4] | NOT JUDGED |
| 5 | NVT[5] | NOT JUDGED |

FIG. 10B NAVIGATION CACHE UNIT

|   | NVT | DISPLAY HISTORY MARK |
|---|---|---|
| 1 | NVT[1] | ●HIT |
| 2 | NVT[2] | ●HIT |
| 3 | NVT[3] | MISSED |
| 4 | NVT[4] | MISSED |
| 5 | NVT[5] | MISSED |

FIG. 10C NAVIGATION CACHE UNIT

|   | NVT | DISPLAY HISTORY MARK |
|---|---|---|
| 1 | NVT[1] | ●HIT |
| 2 | NVT[2] | ●HIT |
| 3 | FREE AREA | |
| 4 | FREE AREA | |
| 5 | FREE AREA | |

FIG. 10D NAVIGATION CACHE UNIT

|   | NVT | DISPLAY HISTORY MARK |
|---|---|---|
| 1 | NVT[1] | ●HIT |
| 2 | NVT[2] | ●HIT |
| 3 | NVT[11] | NOT JUDGED |
| 4 | NVT[12] | NOT JUDGED |
| 5 | NVT[21] | NOT JUDGED |

FIG. 10E
NAVIGATION CACHE UNIT

|   | NVT    | DISPLAY HISTORY MARK |
|---|--------|----------------------|
| 1 | NVT[1] | ● HIT                |
| 2 | NVT[2] | ● HIT                |
| 3 | NVT[11]| MISSED               |
| 4 | NVT[12]| ● HIT                |
| 5 | NVT[21]| MISSED               |

FIG. 10F
NAVIGATION CACHE UNIT

|   | NVT    | DISPLAY HISTORY MARK |
|---|--------|----------------------|
| 1 | NVT[1] | ● HIT                |
| 2 | NVT[2] | ● HIT                |
| 3 | NVT[12]| ● HIT                |
| 4 | FREE AREA | |
| 5 | FREE AREA | |

FIG. 10G
NAVIGATION CACHE UNIT

|   | NVT    | DISPLAY HISTORY MARK |
|---|--------|----------------------|
| 1 | NVT[41]| NOT JUDGED           |
| 2 | NVT[42]| NOT JUDGED           |
| 3 | NVT[12]| ● HIT                |
| 4 | NVT[43]| NOT JUDGED           |
| 5 | NVT[44]| NOT JUDGED           |

FIG. 11A
PRESENTATION CACHE UNIT

|   | PRESENTATION STREAM | DISPLAY HISTORY MARK | MOTION PICTURE/FRAME |
|---|---|---|---|
| 1 | PRESENTATION STREAM[1] | ●HIT | MOTION PICTURE |
| 2 | PRESENTATION STREAM[2] | NOT JUDGED | MOTION PICTURE |
| 3 | PRESENTATION STREAM[3] | NOT JUDGED | MOTION PICTURE |
| 4 | PRESENTATION STREAM[4] | NOT JUDGED | FRAME |
| 5 | PRESENTATION STREAM[5] | NOT JUDGED | FRAME |

FIG. 11B
PRESENTATION CACHE UNIT

|   | PRESENTATION STREAM | DISPLAY HISTORY MARK | MOTION PICTURE/FRAME |
|---|---|---|---|
| 1 | PRESENTATION STREAM[1] | ●HIT | MOTION PICTURE |
| 2 | PRESENTATION STREAM[2] | ●HIT | MOTION PICTURE |
| 3 | PRESENTATION STREAM[3] | NOT JUDGED | MOTION PICTURE |
| 4 | PRESENTATION STREAM[4] | NOT JUDGED | FRAME |
| 5 | PRESENTATION STREAM[5] | NOT JUDGED | FRAME |

FIG. 11C
PRESENTATION CACHE UNIT

|   | PRESENTATION STREAM | DISPLAY HISTORY MARK | MOTION PICTURE/FRAME |
|---|---|---|---|
| 1 | PRESENTATION STREAM[1] | ●HIT | MOTION PICTURE |
| 2 | PRESENTATION STREAM[2] | ●HIT | MOTION PICTURE |
| 3 | FREE AREA |  |  |
| 4 | FREE AREA |  |  |
| 5 | FREE AREA |  |  |

FIG. 11D

PRESENTATION CACHE UNIT

| | PRESENTATION STREAM | DISPLAY HISTORY MARK | MOTION PICTURE/FRAME |
|---|---|---|---|
| 1 | PRESENTATION STREAM[1] | ●HIT | MOTION PICTURE |
| 2 | PRESENTATION STREAM[2] | ●HIT | MOTION PICTURE |
| 3 | PRESENTATION STREAM[11] | NOT JUDGED | MOTION PICTURE |
| 4 | PRESENTATION STREAM[12] | NOT JUDGED | FRAME |
| 5 | PRESENTATION STREAM[21] | NOT JUDGED | FRAME |

FIG. 11E

PRESENTATION CACHE UNIT

| | PRESENTATION STREAM | DISPLAY HISTORY MARK | MOTION PICTURE/FRAME |
|---|---|---|---|
| 1 | PRESENTATION STREAM[1] | ●HIT | MOTION PICTURE |
| 2 | PRESENTATION STREAM[2] | ●HIT | MOTION PICTURE |
| 3 | PRESENTATION STREAM[11] | MISSED | MOTION PICTURE |
| 4 | PRESENTATION STREAM[12] | ●HIT | FRAME |
| 5 | PRESENTATION STREAM[21] | MISSED | FRAME |

FIG. 11F

PRESENTATION CACHE UNIT

| | PRESENTATION STREAM | DISPLAY HISTORY MARK | MOTION PICTURE/FRAME |
|---|---|---|---|
| 1 | PRESENTATION STREAM[1] | ●HIT | MOTION PICTURE |
| 2 | PRESENTATION STREAM[2] | ●HIT | MOTION PICTURE |
| 3 | PRESENTATION STREAM[12] | ●HIT | FRAME |
| 4 | FREE AREA | | |
| 5 | FREE AREA | | |

FIG. 11G

PRESENTATION CACHE UNIT

|   | PRESENTATION STREAM | DISPLAY HISTORY MARK | MOTION PICTURE/FRAME |
|---|---|---|---|
| 1 | PRESENTATION STREAM[41] | NOT JUDGED | |
| 2 | PRESENTATION STREAM[42] | NOT JUDGED | |
| 3 | PRESENTATION STREAM[12] | ●HIT | FRAME |
| 4 | PRESENTATION STREAM[43] | NOT JUDGED | |
| 5 | PRESENTATION STREAM[44] | NOT JUDGED | |

FIG. 12

|         | STATISTICS VALUE |         | STATISTICS VALUE |
|---------|------------------|---------|------------------|
| NVT[1]  | 15               | NVT[41] | 18               |
| NVT[2]  | 16               | NVT[42] | 17               |
| NVT[3]  | 18               | NVT[43] | 16               |
| NVT[4]  | 4                | NVT[44] | 15               |
| NVT[5]  | 6                | NVT[45] | 14               |
| NVT[6]  | 10               | NVT[46] | 7                |
| NVT[7]  | 11               | NVT[47] | 3                |
| NVT[8]  | 12               | NVT[48] | 2                |
| NVT[9]  | 6                | NVT[49] | 1                |
| NVT[10] | 2                | NVT[50] | 11               |
| NVT[11] | 3                | NVT[51] | 10               |
| NVT[12] | 5                | NVT[52] | 11               |
| NVT[13] | 6                | NVT[53] | 14               |
| NVT[14] | 4                | NVT[54] | 9                |
| NVT[15] | 3                | NVT[55] | 7                |
| NVT[16] | 13               | NVT[56] | 7                |
| NVT[17] | 15               | NVT[57] | 7                |
| NVT[18] | 11               | NVT[58] | 6                |
| NVT[19] | 8                | NVT[59] | 11               |

FIG. 13A

CACHE TABLE BASED ON STATISTICS VALUES

| content[41] |
|---|
| content[42] |
| content[43] |
| content[44] |
| content[45] |

FIG. 13B

CACHE TABLE BASED ON RANK

| content[45] |
|---|
| content[47] |
| content[46] |
| content[43] |
| content[44] |

FIG. 13C

CACHE TABLE BASED ON CURSOR POSITION

| content[41] |
|---|
| content[42] |
| content[43] |
| content[45] |
| content[46] |

IMAGE OF PRESENTATION STREAM[1]
+ICONS OF NVT[1]

ICON "NEW MOVIE INFORMATION" LINKS TO    CONTENT[2]
ICON "INTERNET LATEST INFORMATION" LINKS TO    CONTENT[3]
ICON "EVENT INFORMATION" LINKS TO    CONTENT[4]
ICON "PROGRAM PREVIEW" LINKS TO    CONTENT[5]

IMAGE OF PRESENTATION STREAM[2]
+ICONS OF NVT[2]

ICON "THE TERROR OF THE HUGE TORNADO" LINKS TO    CONTENT[11]
ICON "THE RETURN OF THE MONSTROUS DINOSAURS" LINKS TO    CONTENT[12]
ICON "SPORTS WARS" LINKS TO    CONTENT[21]

FIG. 22C

IMAGE OF PRESENTATION STREAM[12]
+ICONS OF NVT[12]

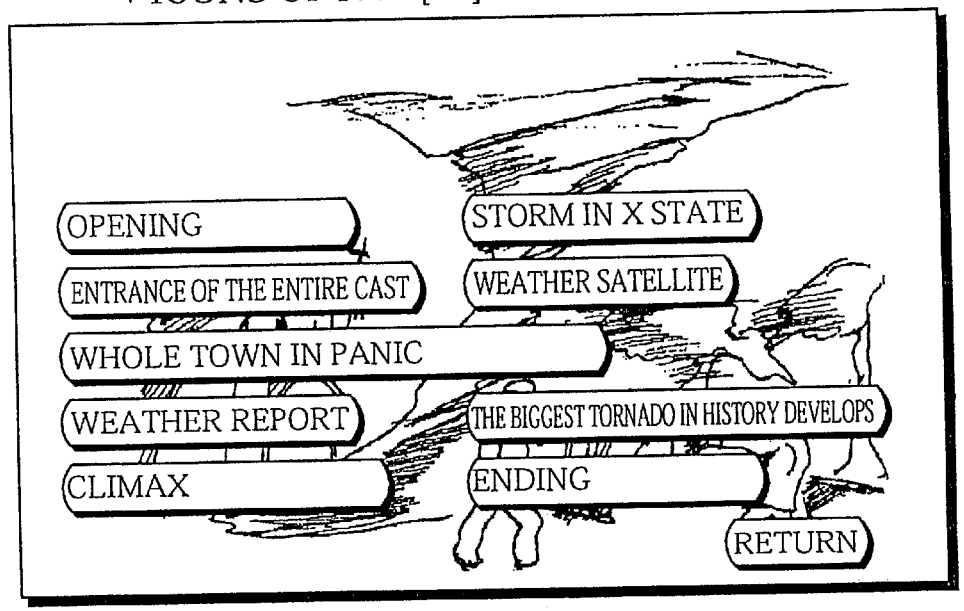

ICON "OPENING" LINKS TO    CONTENT[41]
ICON "STORM IN X STATE" LINKS TO    CONTENT[42]
ICON "ENTRANCE OF THE ENTIRE CAST" LINKS TO    CONTENT[43]
ICON "WEATHER SATELLITE" LINKS TO    CONTENT[44]
ICON "WHOLE TOWN IN PANIC" LINKS TO    CONTENT[45]
ICON "WEATHER REPORT" LINKS TO    CONTENT[46]
ICON "THE BIGGEST TORNADO IN HISTORY DEVELOPS" LINKS TO    CONTENT[47]
ICON "CLIMAX" LINKS TO    CONTENT[48]
ICON "ENDING" LINKS TO    CONTENT[49]

IMAGE OF PRESENTATION STREAM[43]
+ICONS OF NVT[43]

FIG. 24A

VET(15)  PID=0x0083

VE_id_exetension=0x0001

| first_pts | 360000 |
|---|---|
| last_pts | 360000 |
| stream_id | 0xef |
| component_tag | 0x0001 |

FIG. 24B

VET(16)  PID=0x0083

VE_id_exetension=0x0000

| first_pts | — |
|---|---|
| last_pts | — |
| stream_id | 0xe0 |
| component_tag | 0x0000 |

FIG. 25

| HL_index | orig_nw_id | ts_id | VE_svc_id | VE_event_id | VE_id_extension | AE_svc_id | AE_event_id | AE_id_extension | NE_svc_id | NE_event_id | NE_id |
|---|---|---|---|---|---|---|---|---|---|---|---|
| 0 | 0x0001 | 0x0001 | 0x0001 | 0x0001 | 0x0000 | — | — | — | 0x0001 | 0x0001 | 0x0000 |
| 1 | 0x0001 | 0x0001 | 0x0001 | 0x0001 | 0x0001 | — | — | — | 0x0001 | 0x0001 | 0x0001 |
| 2 | 0x0001 | 0x0001 | 0x0001 | 0x0001 | 0x0002 | — | — | — | 0x0001 | 0x0001 | 0x0002 |
| .. | .. | .. | .. | .. | .. | .. | .. | .. | .. | .. | .. |
| 5 | 0x0001 | 0x0001 | 0x0001 | 0x0001 | 0x0005 | — | — | — | 0x0001 | 0x0001 | 0x0005 |
| .. | .. | .. | .. | .. | .. | .. | .. | .. | .. | .. | .. |

2547

TERMINAL APPARATUS AND METHOD FOR ACHIEVING INTERACTIVE OPERATIONS BY DISPLAYING A DESIRED PIECE OF IMAGE INFORMATION AT HIGH SPEED USING CACHE MEMORIES, OUT OF A LARGE AMOUNT OF IMAGE INFORMATION SENT IN A ONE-WAY DIRECTION

This is a continuation application of U.S. Ser. No. 08/920,992, filed on Aug. 29, 1997, and issued as U.S. Pat. No. 6,191,782 on Feb. 20, 2001.

BACKGROUND OF THE INVENTION (1) Field of the Invention

This invention relates to a terminal apparatus used in communication services such as digital satellite broadcasting and digital CATV (Community Antenna Television), and to a method used for the terminal apparatus.

(2) Description of the Prior Art

As the number of channels provided in the satellite broadcasting or CATV has increased greatly, competition among broadcasting companies has been intensified. Broadcasting companies hope that broadcasting systems known as interactive TV broadcasting systems will attract many viewers, and active studies into interactive TV broadcasting systems are under way. The term "interactive" indicates that the user can display desired images by making requests. Suppose, for example, each screen includes a plurality of icons which are related to other pieces of image information which form screens. It is supposed that in the interactive TV broadcasting system, a desired piece of image information is displayed when the operator selects an icon on the interactive screen. The operator feels as if he/she could display what he/she desired. Such an interactive TV broadcasting system is epoch-making in TV broadcasting where one-way broadcasting has long been the norm. There is a possibility that the interactive TV broadcasting system will become a next-generation standard for TV broadcasting system.

Such an interactive TV broadcasting system may be achieved by a method in which each terminal apparatus sends a request for transmitting a desired piece of image information to the broadcasting station, and in response, the broadcasting station transmits the desired piece of image information to the terminal apparatuse. For achieving this, the broadcasting station needs to store a large amount of image information which can be provided to the terminal apparatuses.

It is increasingly difficult to achieve the above system as the number of terminal apparatuses increases. This is because a number of communication lines need to be provided for transferring the transmission requests and image information. Such a construction may also suffer from an overflow in handling the transmission requests in the broadcasting station due to an overflow in the communication lines which are used for transferring the read requests and image information. Viewers may stop using such an interactive TV broadcasting system if it takes very long to display a desired image.

SUMMARY OF THE INVENTION

It is therefore an object of the present invention to provide a terminal apparatus and a method used therein for immediately displaying a desired piece of image information in an interactive broadcasting system upon request of the operator, where a large number of terminal apparatuses receive broadcasts in the interactive broadcasting system.

The above object is achieved by a terminal apparatus for displaying an image by reproducing one out of m pieces of image information and for interactively changing the image using n pieces of navigation information, where the image is one of a moving picture, a still picture, and a mixture of a moving picture and a still picture, where the m pieces of image information and the n pieces of navigation information together are broadcast by a broadcasting station to the terminal apparatus, where each piece of navigation information is related to an origin piece of image information and indicates a plurality pieces of link-target image information, where m and n are each an integer either of being equal to and larger than "1," the terminal apparatus including: a cache unit for storing a pair of one out of the m pieces of image information and one out of the n pieces of navigation information; reproducing unit for reproducing the one out of the m pieces of image information stored in the cache unit; monitoring unit for monitoring whether an operator has performed a certain operation responding to the image displayed; a receiving unit for, before the monitoring unit determines that the operator has performed the certain operation, receiving s pieces of image information which have possibility of being displayed and t pieces of navigation information respectively related to the s pieces of image information based on the one out of the n pieces of navigation information stored in the cache unit, and storing the s pieces of image information and the t pieces of navigation information in the cache unit, where s is an integer satisfying $1 \leq s < m$, and t is an integer satisfying $1 \leq t < n$; a specifying unit for specifying one out of the plurality pieces of link-target image information based on the certain operation when the monitoring unit monitors that the operator has performed the certain operation; an identifying unit for identifying the one out of the plurality pieces of link-target image information specified by the specifying unit as one out the s pieces of image information stored in the cache unit; and a first controlling unit for reading the piece of link-target image information identified by the identifying unit and instructing the reproducing unit to reproduce the piece of link-target image information, and instructing the receiving unit to receive other s pieces of image information and other t pieces of navigation information based on one out of the t pieces of navigation information in the cache unit corresponding to the piece of link-target image information identified by the identifying unit.

With such a construction, a desired piece of image information is immediately displayed. The current screen is changed to the next screen at high speed upon request of the operator since while the current screen is displayed, a plurality pieces of link-target image information and corresponding pieces of navigation information are stored in the cache unit. The above screen change is also performed using the waiting time of the terminal apparatus for a period during which the operator determines an icon on the screen.

The above terminal apparatus may further include: a superimposing unit for superimposing, based on a piece of navigation information corresponding to the one out of the m pieces of image information stored in the cache unit, a plurality of icons on the image which is displayed when the reproducing unit reproduces the one out of the m pieces of image information, where the monitoring unit includes: a determination operation detecting unit for detecting a determination operation performed on one out of the plurality of icons, where the identifying unit identifies one out of the plurality pieces of link-target image information detected by the determination operation detecting unit.

With such a construction, a visual interactive operation is achieved since a plurality of icons, which indicate link-target pieces of image information, are superimposed on the screen image.

In the above terminal apparatus, the reproducing unit may include: a focus setting unit for making one out of the plurality of icons be in focus, where the monitoring unit includes: a cursor move operation detecting unit for detecting a cursor move operation; and a focus changing unit for making another one out of the plurality of icons be in focus based on the cursor move operation detected by the cursor move operation detecting unit, where the determination operation detecting unit detects a determination operation performed on the other one out of the plurality of icons in focus.

With such a construction, the cursor (icon in focus) is moved based on the interactive operation. This enables cursor moves with the use of cross keys.

The above terminal apparatus may further include: a rank setting unit for setting ranks of the m pieces of image information stored in the cache unit based on possibility of being displayed; and a cache table registering unit for registering identifiers of high ranking s pieces of image information in a cache table, out of the m pieces of image information and registering identifiers of t pieces of navigation information corresponding to the high ranking s pieces of image information, where the receiving unit receives the s pieces of image information whose identifiers are registered by the cache table registering unit and receives t pieces of navigation information corresponding to the s pieces of image information.

With such a construction, a certain number of pieces of image information having possibility of being displayed are stored in the cache unit. Therefore, these pieces of image information and corresponding navigation information are displayed with high probability.

The above terminal apparatus may further include: a weighting unit for weighting, with a highest value, the one out of the plurality of icons made to be in focus by the focus setting unit, and for weighting, with a second highest value, icons adjacent to the one in focus, where the rank setting unit sets ranks of the m pieces of image information based on values weighted by the weighting unit.

With such a construction, information related to the icon in focus and the adjacent icons is stored in the cache unit. Therefore, these pieces of image information and corresponding navigation information are displayed with high probability.

The above terminal apparatus may further include: a statistics value storing unit for storing a statistics value for each piece of image information which indicates a number of times the piece of image information has been determined, where the rank setting unit sets ranks of the m pieces of image information based on the statistics value for each piece of image information.

With such a construction, the possibility of being displayed is evaluated based on the statistics values. Therefore, these pieces of image information and corresponding navigation information are displayed with high probability.

The above terminal apparatus may further include: a rank information detecting unit for detecting a piece of rank information from the piece of navigation information corresponding to the one out of the m pieces of image information reproduced by the reproducing unit, where the piece of rank information includes ranks of the plurality pieces of link-target image information, where the rank setting unit sets ranks of the m pieces of image information based on the piece of rank information.

With such a construction, the possibility of being displayed is evaluated based on the rank included in each piece of navigation information. Therefore, these pieces of image information and corresponding navigation information are displayed with high probability.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 1A shows a pictorial view of a satellite broadcasting system;

FIG. 3 shows the content of NVT [1];

FIG. 4 shows the content of NVT [2];

FIG. 5 shows the content of NVT [12];

FIG. 6 shows the content of PMT;

FIG. 8A shows an appearance of the viewing system for satellite broadcasting;

FIGS. 10A–10G show contents of navigation cache unit 14;

FIGS. 11A–11G show contents of presentation cache unit 15;

FIG. 12 shows a statistics table stored in statistics table storing unit 18;

FIG. 13A shows a cache table which is generated based on the statistics table;

FIG. 13B shows a cache table which is generated based on the "rank" column in the hyperlink table;

FIG. 13C shows a cache table which is generated based on the icon currently in focus;

FIG. 22C shows an interactive screen which is an image generated from presentation stream[12] with the icons of NVT[12] superimposed on the image;

FIG. 24A shows the content of VET[15];

FIG. 24B shows the content of VET[16]; and

FIG. 25 shows a content of the hyperlink table.

DESCRIPTION OF THE PREFERRED EMBODIMENTS

<First Embodiment>

To achieve an interactive TV broadcasting system connected to a large number of terminal apparatuses set in a number of households, it is not ideal to allow the terminal apparatuses to send requests for transmitting images. The present embodiment achieves an interactive TV broadcasting system in which requests for transmitting images are not sent from the terminal apparatuses. In the present embodiment, a TV broadcasting station sends a plurality of images to a plurality of terminal apparatuses so that the terminal apparatuses each can interactively select and receive a desired image.

In such a broadcasting system, the interactivity is achieved by one-way image transmission since it is not necessary for the terminal apparatuses to send image transmission requests to the TV broadcasting station. On the other hand, the TV broadcasting station is required to send quite a large number of images to the terminal apparatuses since it must send all the necessary images for achieving the interactivity. When this happens, that is, when the number of sent images increases, the time taken to receive and display the images also increases.

FIG. 1A shows a pictorial view of a satellite broadcasting system described in the present embodiment. As shown in this drawing, broadcasting station 100 transmits a broadcasting wave to broadcasting satellite 200, as indicated by dotted line h1. Broadcasting satellite 200 sends this broadcasting wave to a wide region on the earth, as indicated by dotted lines h2, h3, h4, and h5, so that terminal apparatuses in this region receive the broadcasting wave. Broadcasting station 100 and broadcasting satellite 200 repeat such transmissions in a unit cycle of several minutes. This enables a large number of terminal apparatuses in the region to receive the broadcasting wave.

The broadcasting wave mentioned above is a carrier wave which has been modulated from transport streams with the QPSK (Quadrature Phase Shift Keying) method.

Each of the transport streams is composed of various types of data, or multiple data. The transport stream is defined in detail in MPEG (Motion Picture Experts Group). A transport stream is composed of a large number of transport packets. The transport packet is used for transmitting data and is the smallest unit of data whose transmission is assured. Each transport packet includes an error detection code and an error correction code.

Figure 1B:
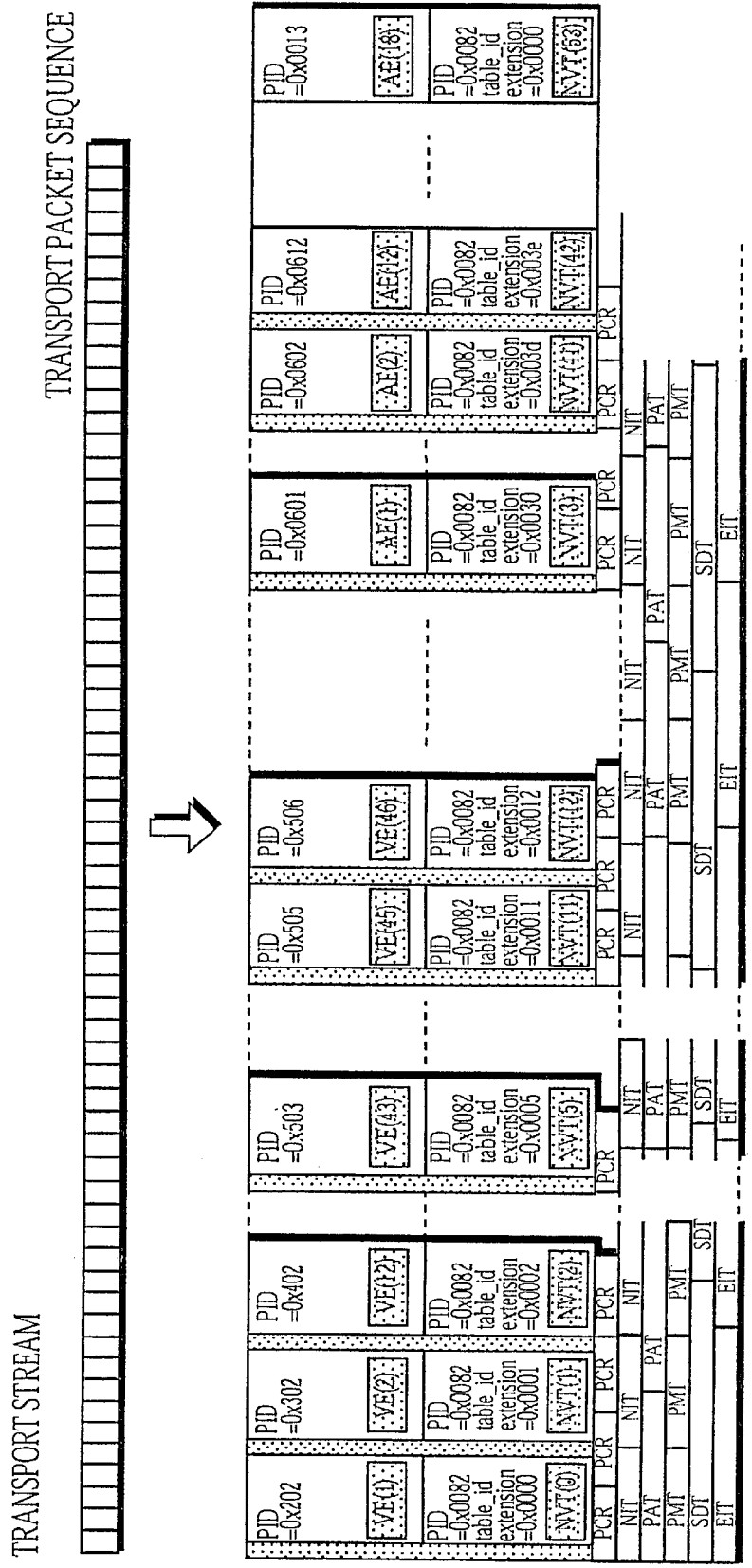
FIG. 1B shows the construction of the transport stream which is divided into a number of transport packets.

FIG. 1B shows the construction of the transport stream. The transport stream is represented by a horizontally-long rectangle in the upper part of the drawing, the transport stream being divided into a number of boxes representing transport packets.

The lower part of FIG. 1B shows a plurality of sub-streams of the transport stream. The sub-streams are: a video elementary stream which is composed of video elements (represented each as "VE" in the drawing), an video elementary stream which is composed of audio elements (represented each as "AE" in the drawing), a navigation information table (NVT) sub-stream which is composed of NVTs (represented each as "NVT" in the drawing), a program clock reference (PCR) table sub-stream (represented each as "PCR" in the drawing) for synchronizing the video elements with the audio elements, a program association table (PAT) sub-stream which is composed of PATs (represented each as "PAT" in the drawing), a program map table (PMT) sub-stream which is composed of PMTs (represented each as "PMT" in the drawing), a network information table (NIT) sub-stream which is composed of NITs (represented each as "NIT" in the drawing) for indicating which satellite is used to relay the transport packets, that is, for indicating to which network the transport packets belong, a service description table sub-stream (represented as "SDT" in the drawing) for indicating which program is broadcast by the transport packets, that is, for indicating to which service the transport packets belong, and an event information table (EIT) sub-stream which is composed of EITs (represented each as "EIT" in the drawing) for indicating to which channel, namely to which event, the transport packets belong. For more information on the above sub-streams, refer to ETS 300 468 standard (DVB-SI standard) and ISO/IEC 13818-1 (MPEG2 system standard).

As described above, transport streams, each including various types of data as shown in FIG. 1B, are transmitted.

Each transport packet, which belongs to a video element or an audio element, includes a packet identifier (PID) which indicates to which element the transport packet belongs.

A plurality of video elements, audio elements, and PCRs make up a presentation stream which corresponds to one scene in a film.

VE[1], VE[2], VE[12], VE[43] . . . in FIG. 1B include their own PIDs. For example, VE[1] includes PID "0x202;" VE[2] includes PID "0x302."

FIGS. 2A–2D show examples of audio elements and video elements making up a presentation stream.

Figure 2A:
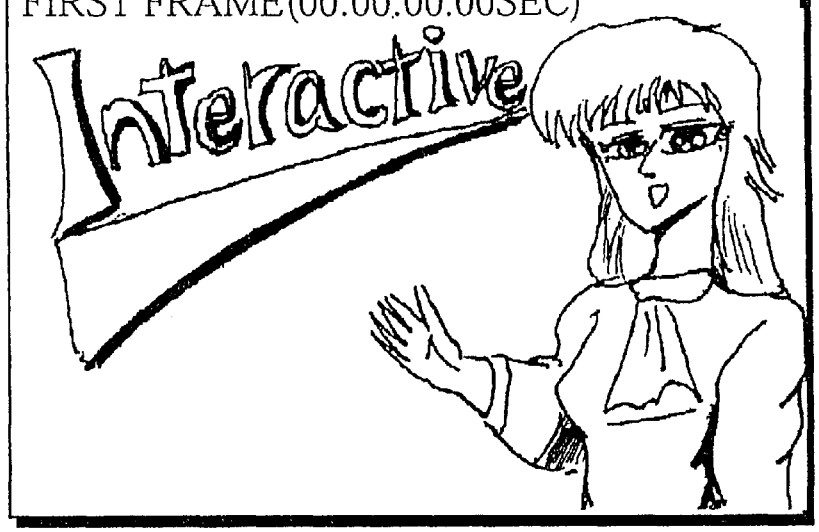
FIG. 2A shows the first frame of video element [1] and a corresponding voice in audio element[1], both included in presentation stream [1]

Presentation stream[1] includes audio element[1] with PID "0x601" and video element[1] with PID "0x202." FIG. 2A shows a scene which is obtained by decoding video element[1]. In this scene, an announcer of a broadcasting company makes an introductory speech for about two-minutes. The video element[1] is accompanied by audio element[1] which includes a narration: "INTRODUCING INTERACTIVE CHANNEL. THANK YOU FOR SELECTING THE 'A' BROADCAST. FOR TODAY'S BROADCAST, WE WILL BE SHOWING THE FOLLOWING PROGRAMS. WE ARE SURE YOU WILL ENJOY THEM."

Figure 2B:
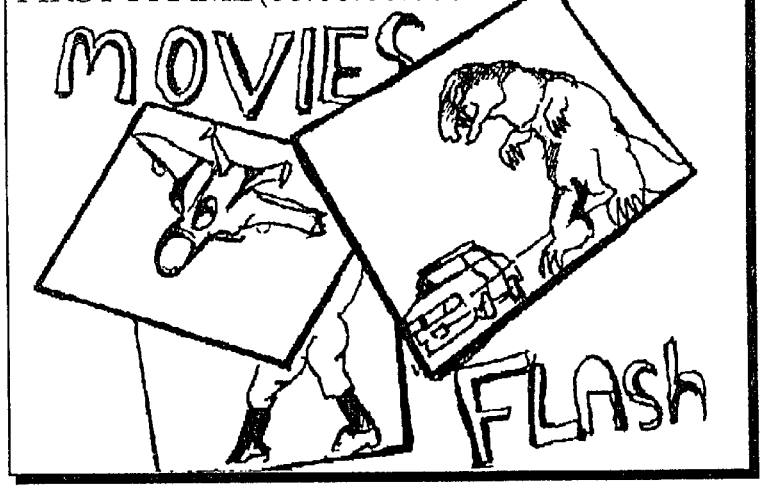
FIG. 2B shows the first frame of video element[2] and a corresponding voice in audio element[2], both included in presentation stream [2]

Presentation stream[2] includes audio element[2] with PID "0x602" and video element[2] with PID "0x302." FIG. 2B shows a scene which is displayed by decoding video element[2]. The scene provides a preview of films to be released soon. The video element[2] is accompanied by audio element[2] which includes a narration: "NEW MOVIE INFORMATION. COMING UP SOON AT THEATERS IN OSAKA."

Figure 2C:
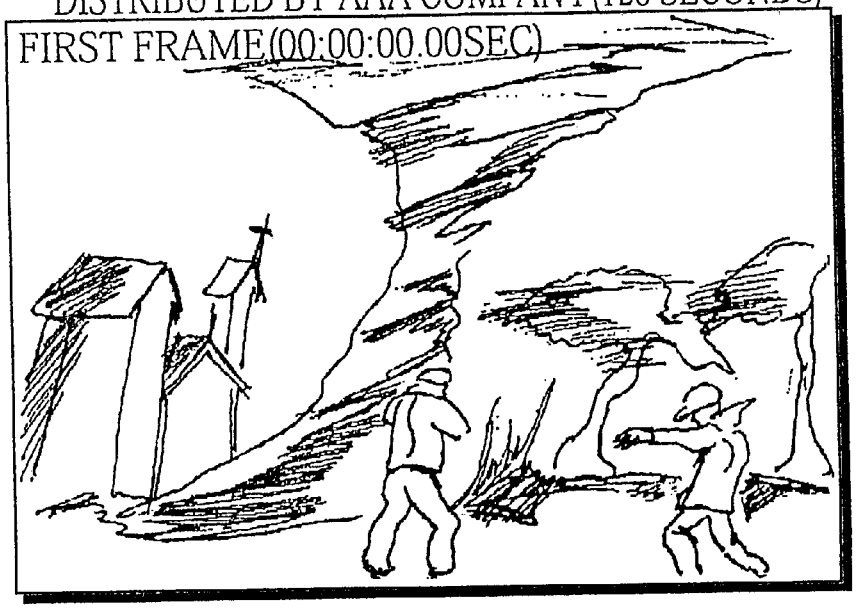
FIG. 2C shows the first frame of video element[12] and a corresponding voice in audio element[12], both included in presentation stream [12]
Figure 2D:
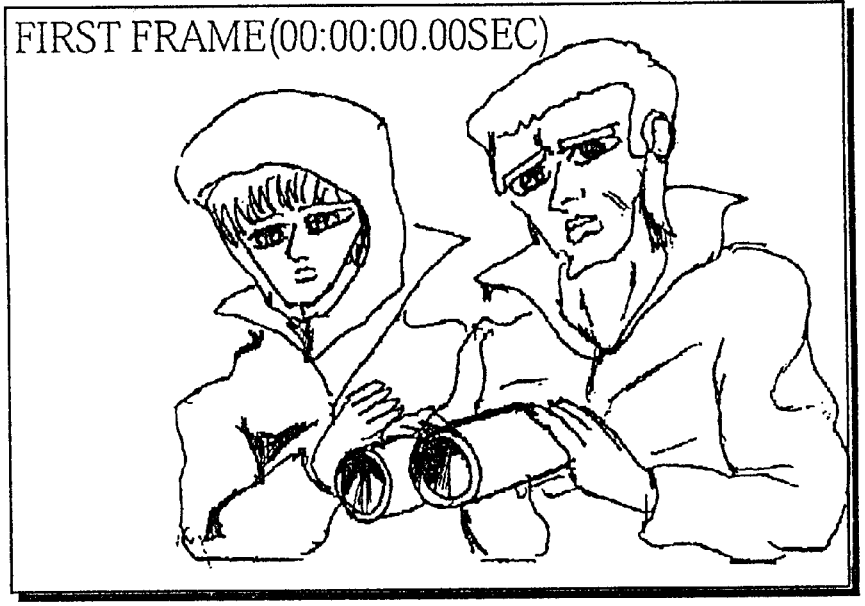
FIG. 2D shows the first frame of video element[43] and a corresponding voice in audio element[43], both included in presentation stream [43]

FIGS. 2C and 2D respectively show the content of presentation streams[12] and [43]. Presentation streams[12] and [43] respectively include the shots and narrations shown in the drawings.

The "NVT" is important as a private section under ISO/IEC 13818-1 standard. Each private section can additionally include a "table_id_extension" which is called a table identifier. Each of NVTs[0], [1], [2], and [12] shown in FIG. 1B, for example, includes a common PID, "0x0082." NVT[0] also includes table identifier "0x0000." NVT[1] includes table identifier "0x0001," NVT[2] table identifier "0x0002," and NVT[12] table identifier "0x0012." That means, a video element or an audio element identifies itself with a PID; an NVT identifies itself with a table identifier.

Now, the navigation information table (NVT) is described.

The NVT includes navigation information which is used for displaying icons on the screen and moving the icons based on interactive operations made with the operator. The icons in the present embodiment are any of patterns, characters, and colors, or combinations of these elements. The icons are used to inform the operator of the content of information, and is used as option items. A representative method of indicating a selected icon is a cursor display. The cursor display described here is a different color of one icon than the other icons displayed on the screen. This is an effective way for drawing the attention of the operator to the icon. The icon with the different color is also called an icon in focus. That means, as the cursor moves, the color of the icon also changes.

Now, the data structure of the NVT is described with reference to FIGS. 3, 4, and 5.

FIG. 3 shows the content of NVT[1] shown in FIG. 1B. FIG. 4 shows the content of NVT[2] shown in FIG. 1B. FIG. 5 shows the content of NVT[12] shown in FIG. 1B. Each NVT is composed of bit map table 301, object definition table 302, handler definition table 303, and hyperlink table 304. Each piece of information in each table is related to each other. For example, a piece of information with index number 1 in the object definition table 302 is related to a piece of information with HD_index number 1 in the handler definition table 303 as indicated by the HANDLER column, and further to a piece of information with HL_index number 1 in the hyperlink table 304 as indicated by the "script" column. Such pieces of information in the NVT related to each other make up a piece of navigation information.

Bit map table 301 of NVT[1] shown in FIG. 3 is composed of bitmap 1 used as an icon indicating "NEW MOVIE INFORMATION," bitmap 2 as an icon indicating "INTERNET LATEST INFORMATION," bitmap 3 as an icon indicating "EVENT INFORMATION," bitmap 4 as an icon indicating "PROGRAM PREVIEW," and bitmaps 101–104 which are copies of bitmaps 1–4 and are highlighted.

The bit map table of NVT[2] shown in FIG. 4 is composed of bitmap 5 used as an icon indicating "THE TERROR OF THE HUGE TORNADO (DISTRIBUTED BY AAA COMPANY)," "THE RETURN OF THE MONSTROUS DINOSAURS (DISTRIBUTED BY BBB COMPANY)," "SPORTS WARS (DISTRIBUTED BY AAA COMPANY)," and "RETURN," and bitmaps 105–108 which are copies of bitmaps 5–8 and are highlighted.

While each of the bitmap tables of NVT[1] and NVT[2] includes four pieces of bitmap information, some bitmap tables include as many as 10 pieces of bitmap information. NVT[12] shown in FIG. 5 provides an example of such a bitmap table.

Object definition table 302 is composed of a plurality pieces of object definition information which is used to define the icons included in the same NVT as objects. The object definition table 302 includes columns called "index," "type," "X-coordinate," "Y-coordinate," "HANDLER," "normal_bitmap," and "focused_bitmap."

The "index" column shows the index number of each piece of information included in the table.

The "type" column shows the object type. For example, each piece of information in the object definition table is specified as "Button" in the type column, which indicates that the icon has a characteristic as a button.

The values in the "X-coordinate" and "Y-coordinate" columns show the respective X and Y coordinates of the standard display position on the display screen. For example, X and Y coordinates of navigation informational are respectively x1=50 and y1=50; X and Y coordinates of navigation information[2] are respectively x2=100 and y2=50. The origin of the coordinate system is in the upper-left corner. Bitmap 1 representing the "NEW MOVIE INFORMATION" icon is displayed at a position specified by x1=50 and y1=50, an upper-left position on the screen. Bitmap 2 representing the "INTERNET LATEST INFORMATION" icon is displayed at a position specified by x2=100 and y2=50, an upper-right position on the screen.

The "HANDLER" column points out an HD_index number in the handler definition table 303. The information with the HD index number includes a script as shown in the "script" column which shows a link-target "content" by the HL index number in the hyperlink table 304, where a "content" is composed of a NVT, a video element, and an audio element.

The "normal_bitmap" column shows bit maps among those included in the bit map table which are displayed normally on the screen.

The "focused_bitmap" column shows bit maps among those included in the bit map table which are displayed highlighted on the screen.

The handler definition table 303 includes columns called "HD_index" and "script."

The "HD_index" column shows the HD_index number of each piece of information included in the table.

The "script" column shows a script included in each piece of information included in the table. Every piece of information the handler definition table 303 shown in FIG. 3 includes "goto_content" statement. The "goto_content" statement instructs the terminal apparatus to fetch a piece of hyperlink information specified in the statement from the hyperlink table 304 and to obtain an NVT, video element, and audio element according to the hyperlink information.

The hyperlink table 304 includes a column called "HL index" and 11 columns which are information elements used to identify the link-target content. This is because detailed information is required to specify a link target content among the vast amount of information provided in the digital broadcasting system.

The "HL_index" column shows the HL_index number of each piece of information included in the table.

The "orig_nw_id" column shows which satellite is used to relay the link-target NVT, video element, and audio element. In other words, the "orig_nw_id" column shows to which network the link-target NVT, video element, and audio element belong.

The "ts_id" column shows which transport stream is used to transfer the link-target content.

The "VE_svc_id" column shows to which TV program (service) the link-target video element belongs among a plurality of TV programs included in the transport stream.

The "VE_event_id" column shows to which broadcasting channel (event) the TV program of the link-target video element belongs.

The "VE_comp_tag" column shows which component tag is attached to the link-target video element, where the component is a stream identified by a PID (packet identifier) as defined in the MPEG2 standard. In the present embodiment, a video element or an audio element may be a component since each of these element includes its own PID. In case a group of video elements or audio elements are assigned one PID, the group is regarded as one component.

The "AE_svc_id" column shows to which TV program (service) the link-target audio element belongs among a plurality of TV programs included in the transport packet.

The "AE_event_id" column shows to which broadcasting channel (event) the TV program including of the link-target audio element belongs.

The "AE_comp_tag" column shows which component tag is attached to the link-target audio element.

The "NE_svc_id" column shows to which TV program (service) the link-target NVT belongs among a plurality of TV programs included in the transport stream.

The "NE_event_id" column shows to which broadcasting channel (event) the TV program of the link-target NVT belongs.

The "NE_id_EXT" column shows which table identifier ("table_id_extension") is attached to the link-target NVT.

The "rank" column shows a rank of the link-target video element, audio element, and NVT, the rank being determined by the broadcasting station according to the frequency of display or the like. In FIG. 3, for example, a piece of information in the hyperlink table 304 with HL_index number 1 (hereinafter, represented as HL_index[1]) has the highest rank, "2," followed by HL_index[2], HL_index[3], and HL_index[4]. The rank may be determined according to answers to questionnaires distributed by the broadcasting company, or according to fashions or topics in recent years.

FIG. 6 shows the content of the PMT (Program Map Table). The PMT includes columns called "PID," "stream_type," and "descriptor."

The "PID" column shows PIDs (Packet IDentifiers).

The "stream_type" column shows a type of each stream.

The "descriptor" column shows a stream descriptor "stream_identifier_descriptor" including a component tag corresponding to each PID. For example, stream descriptor "stream_identifier_descriptor" including component tag "0x0002" is related to "PID0x0302." Stream descriptor "stream identifier_descriptor" including component tag "0x0003" is related to "PID0x0303." The PMT is required for the terminal apparatus to obtain a PID of a transport packet from a component tag of a link-target video element or a link-target audio element obtained from the hyperlink table.

A link-target NVT, video element, or audio element is obtained as follows based on the hyperlink table in NVT and PMT.

<Specifying Link-target NVT>

The "HANDLER" column of the object definition table 302 in NVT specifies one HD_index number of the handler definition table 303. By referring to the script for the obtained HD index number, one HL_index number of the hyperlink table 304 is obtained. By referring to the "NE_id_EXT" column of the table 304, the table identifier attached to the link-target NVT is obtained.

1-1 When bitmap1 of NVT[1] related to the icon indicating "NEW MOVIE INFORMATION" is determined:
HL_index "1"→NE_id_EXT[0x0002]→NVT[2] including table identifier "0x0002" (refer to FIG. 1B for NVT[2] with the table identifier)

1-2 When bitmap2 of NVT[1] related to the icon indicating "INTERNET LATEST INFORMATION" is determined:
HL_index "2"→NE_id_EXT[0x0003]→NVT[3] including table identifier "0x0003" (refer to FIG. 1B)

1-3 When bitmap3 of NVT[1] related to the icon indicating "EVENT INFORMATION" is determined:
HL_index "3"→NE_id_EXT[0x0004]→NVT[4] including table identifier "0x0004" (refer to FIG. 1B)

1-4 When bitmap4 of NVT[1] related to the icon indicating "PROGRAM PREVIEW" is determined:
HL_index "4"→NE_id_EXT[0x0005]→NVT (5) including table identifier "0x0005" (refer to FIG. 1B)

<Specifying Link-target Video Element>

The "HANDLER" column of the object definition table 302 in NVT specifies one HD_index number of the handler definition table 303. By referring to the script for the obtained HD index number, one HL_index number of the hyperlink table 304 is obtained. By referring to the "VE_comp_tag" column of the table 304, the component tag attached to the link-target video element is obtained. By referring to the "descriptor" column of the PMT, the PID attached to the link-target video element is obtained.

2-1 When bitmap1 of NVT[1] related to the icon indicating "NEW MOVIE INFORMATION" is determined:
HL_index "1"→VE_comp_tag[0x0002]→PID[0x0302]→VE[2] (refer to FIG. 1B)

2-2 When bitmap2 of NVT[1] related to the icon indicating "INTERNET LATEST INFORMATION" is determined:
HL_index "2"→VE_comp_tag[0x0003]→PID[0x0303]→VE[3] (refer to FIG. 1B)

2-3 When bitmap3 of NVT[1] related to the icon indicating "EVENT INFORMATION" is determined:
HL_index3→VE_comp_tag[0x0004]→PID[0x0304]→VE[4] (refer to FIG. 1B)

2-4 When bitmap4 of NVT[1] related to the icon indicating "PROGRAM PREVIEW" is determined:
HL_index4→VE_comp_tag[0x0005]→PID[0x0305]→VE[5] (refer to FIG. 1B)

<Specifying Link-target Audio Element>

The "HANDLER" column of the object definition table 302 in NVT specifies one HD_index number of the handler definition table 303. By referring to the script for the obtained HD index number, one HL_index number of the hyperlink table 304 is obtained. By referring to the "AE_comp_tag" column of the table 304, the component tag attached to the link-target audio element is obtained. By referring to the "descriptor" column of the PMT, the PID attached to the link-target audio element is obtained.

2-1 When bitmap1 of NVT[1] related to the icon indicating "NEW MOVIE INFORMATION" is determined:
HL_index "1"→AE_comp_tag[0x0102]→PID[0x0602]→AE[2] (refer to FIG. 1B)

2-2 When bitmap2 of NVT[1] related to the icon indicating "INTERNET LATEST INFORMATION" is determined:
HL_index "2"→AE_comp_tag[0x0103]→PID[0x0603]→AE[3] (refer to FIG. 1B)

2-3 When bitmap3 of NVT[1] related to the icon indicating "EVENT INFORMATION" is determined:
HL_index3→AE_comp_tag[0x0104]→PID[0x0604]→AE[4] (refer to FIG. 1B)

2-4 When bitmap4 of NVT[1] related to the icon indicating "PROGRAM PREVIEW" is determined:

HL__index4→AE__comp__tag[0x0105]→PID[0x0605]→AE[5] (refer to FIG. 1B)

As will be understood from the above description, NVT[1] specifies NVT[2], VE[2], and AE[2] as the link-targets. Such a group of a NVT, a video element, and an audio element specified as link-targets are called a "content." A link-target content is specified by an NVT. Then, another link-target is specified by the NVT of the content. In this way, NVT-content relation is constructed.

Figure 7:
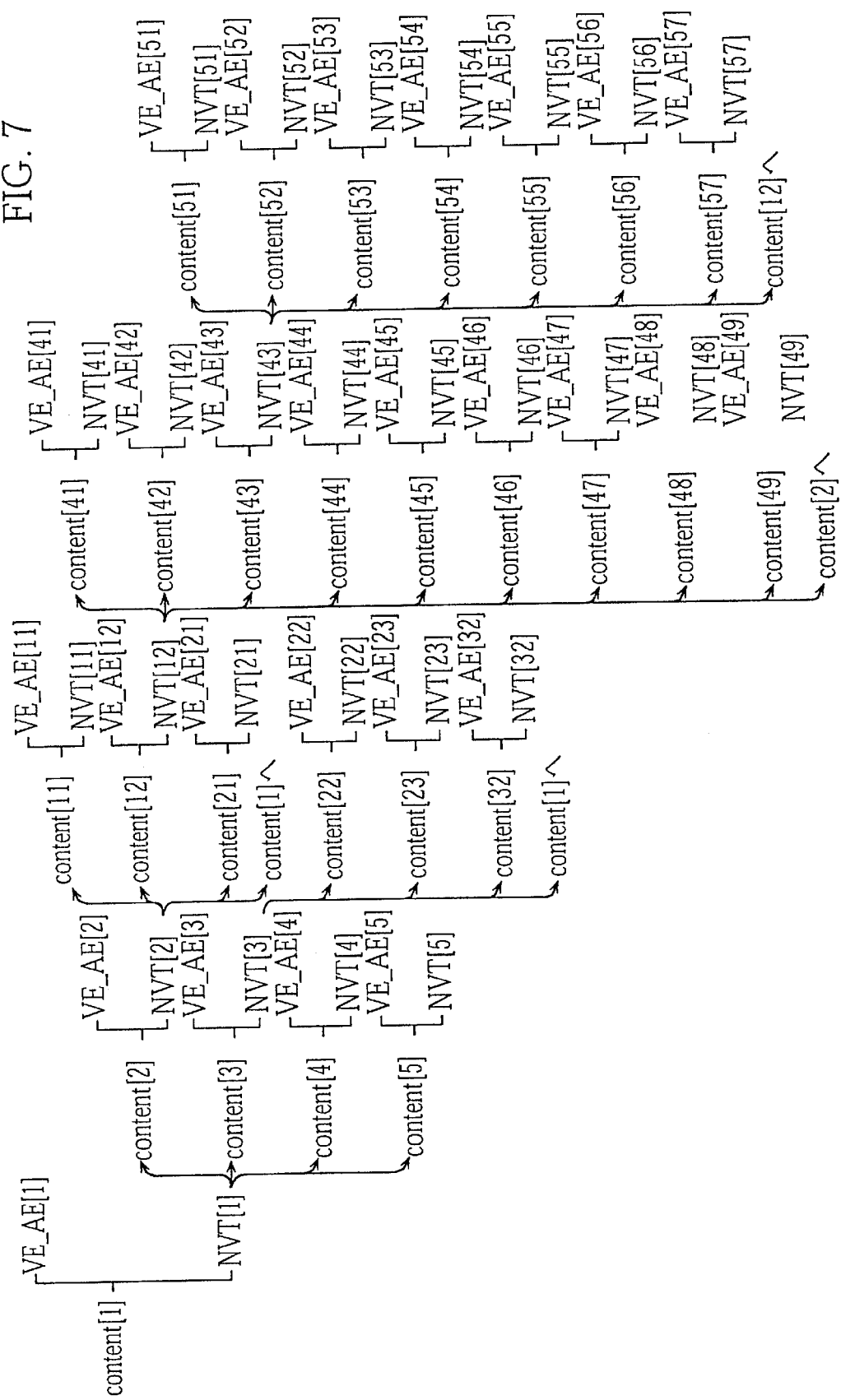
FIG. 7 shows a tree structure formed with NVTs and "contents;"

FIG. 7 shows a tree structure formed with NVTs and "contents" in the present embodiment. The plurality of arrows shown in the drawing indicate the direction of the links. Note that the root of the tree is called "root content."

FIG. 7 indicates that content[1] includes VE[1], AE[1], and NVT[1] (in the drawing, VE[1] and AE[1] is represented as "VE__AE[1]." Hereinafter, a combination of VE and AE included in a content is represented as "VE__AE"). This indicates that when presentation stream[1] is decoded to generate a shot image, the bit maps of NVT[1] are superimposed on the shot image.

Similarly, content[2] includes VE[2], AE[2], and NVT[2]. This indicates that when presentation stream[2] is decoded to generate an image of the preview of films, the bit maps of NVT[2] are superimposed on the image.

Figure 22A:
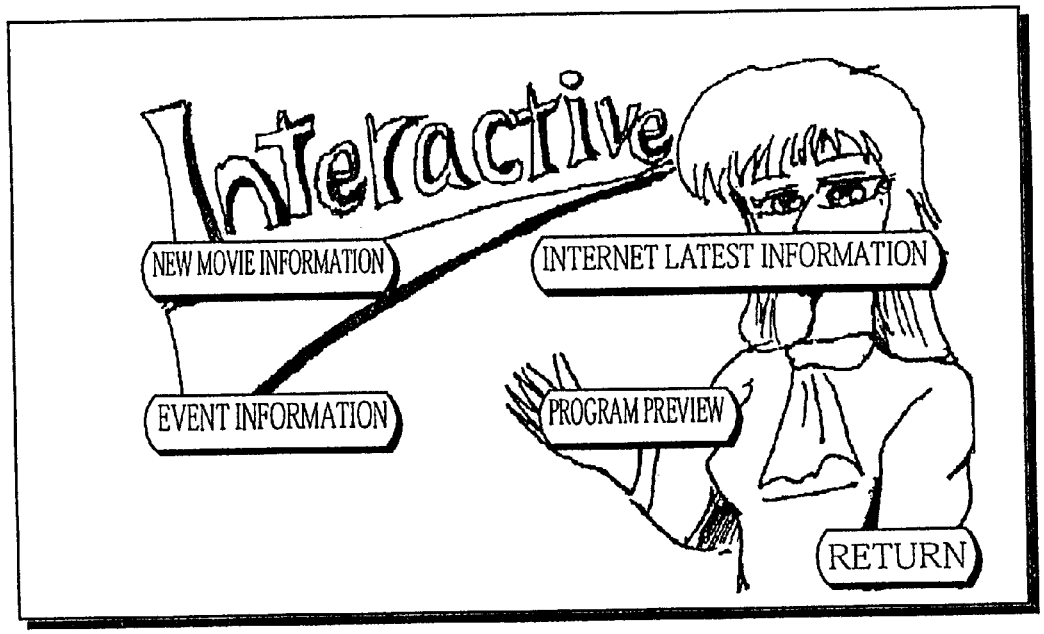
FIG. 22A shows an interactive screen which is an image generated from presentation stream[1] with the icons of NVT[1] superimposed on the image.

A screen which is composed of an image generated from a presentation stream with icons superimposed on the image is called an interactive screen. FIGS. 22A–22D show interactive screens. FIG. 22A, for example, shows an interactive screen which is an image generated from presentation stream[1] with the icons of NVT[1] superimposed on the image.

The transport stream constructed as shown above is repeatedly transmitted from broadcasting station 100 to the terminal apparatuses, as shown in FIG. 1A. Accordingly, the terminal apparatuses can obtain necessary streams or tables. Note that the terminal apparatuses must wait for each cycle period of the transmission for obtaining the necessary streams or tables.

Now, a system for viewing programs which are broadcast with transport streams is described. FIG. 8A shows an appearance of the viewing system which is composed of parabolic antenna 1, terminal apparatus 2, TV receiver 3, and handy remote controller 4.

Parabolic antenna 1 which is set outside a house is used to receive carrier waves of the transport streams transmitted by the broadcasting satellite.

Terminal apparatus 2 fetches transport streams from the carrier waves received by parabolic antenna 1, and decodes the transport streams to NTSC or PAL image signals and stereo audio signals (hereinafter, a combination of an image signal and an audio signal is called an AV signal).

TV receiver 3 outputs images and voices according to the AV signals decoded by terminal apparatus 2.

Handy remote controller 4, while TV receiver 3 outputs images and voices, receives instructions from the operator and outputs infrared ray signals representing the received instructions to terminal apparatus 2.

Figure 8B:
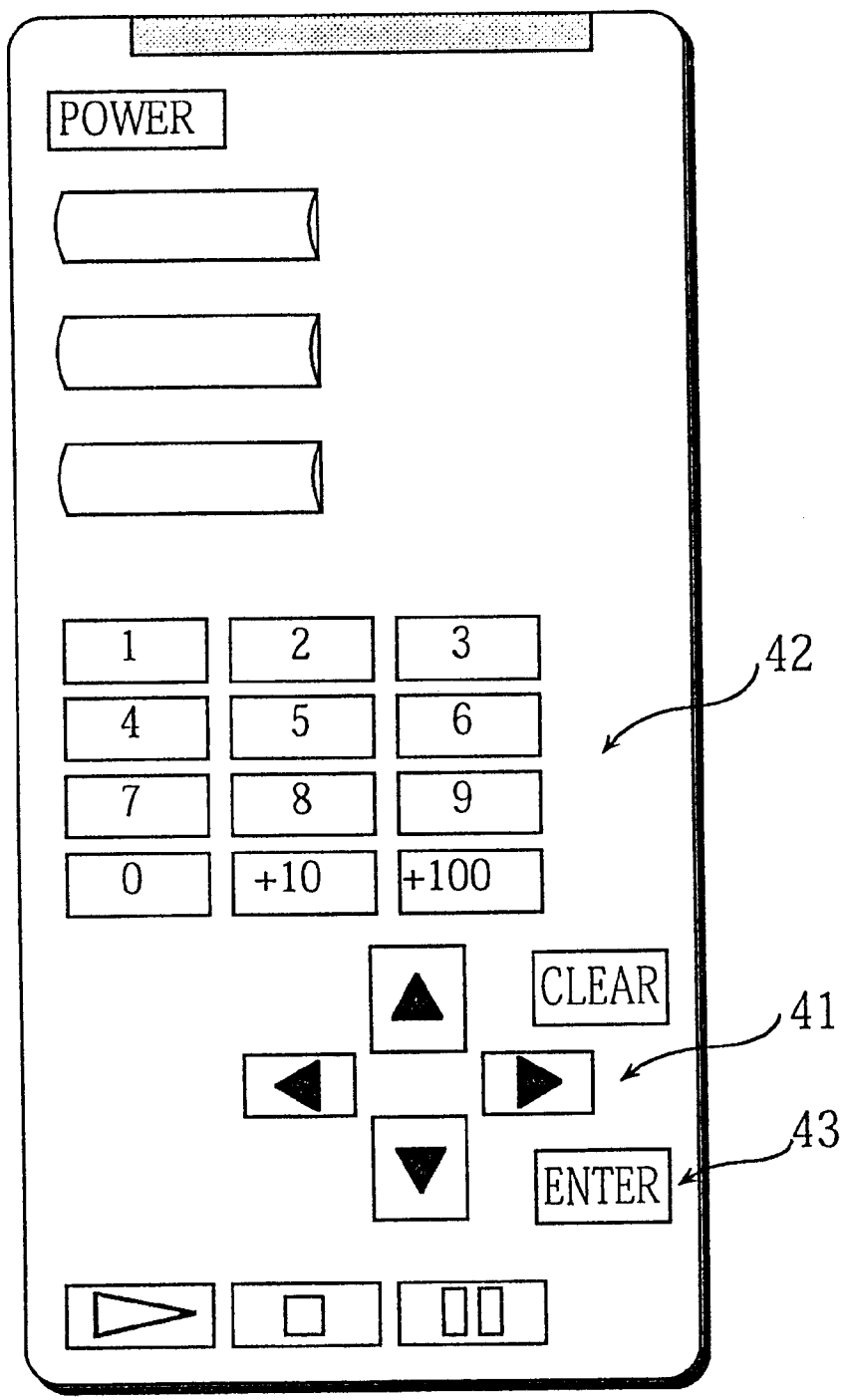
FIG. 8B shows the front panel of handy remote controller 4.

FIG. 8B shows the keys arranged on handy remote controller 4. Handy remote controller 4 includes cross key 41 for moving the cursor, ten keys 42 for specifying numerals for selection, and enter key 43 for determining icons and the like.

Figure 9:
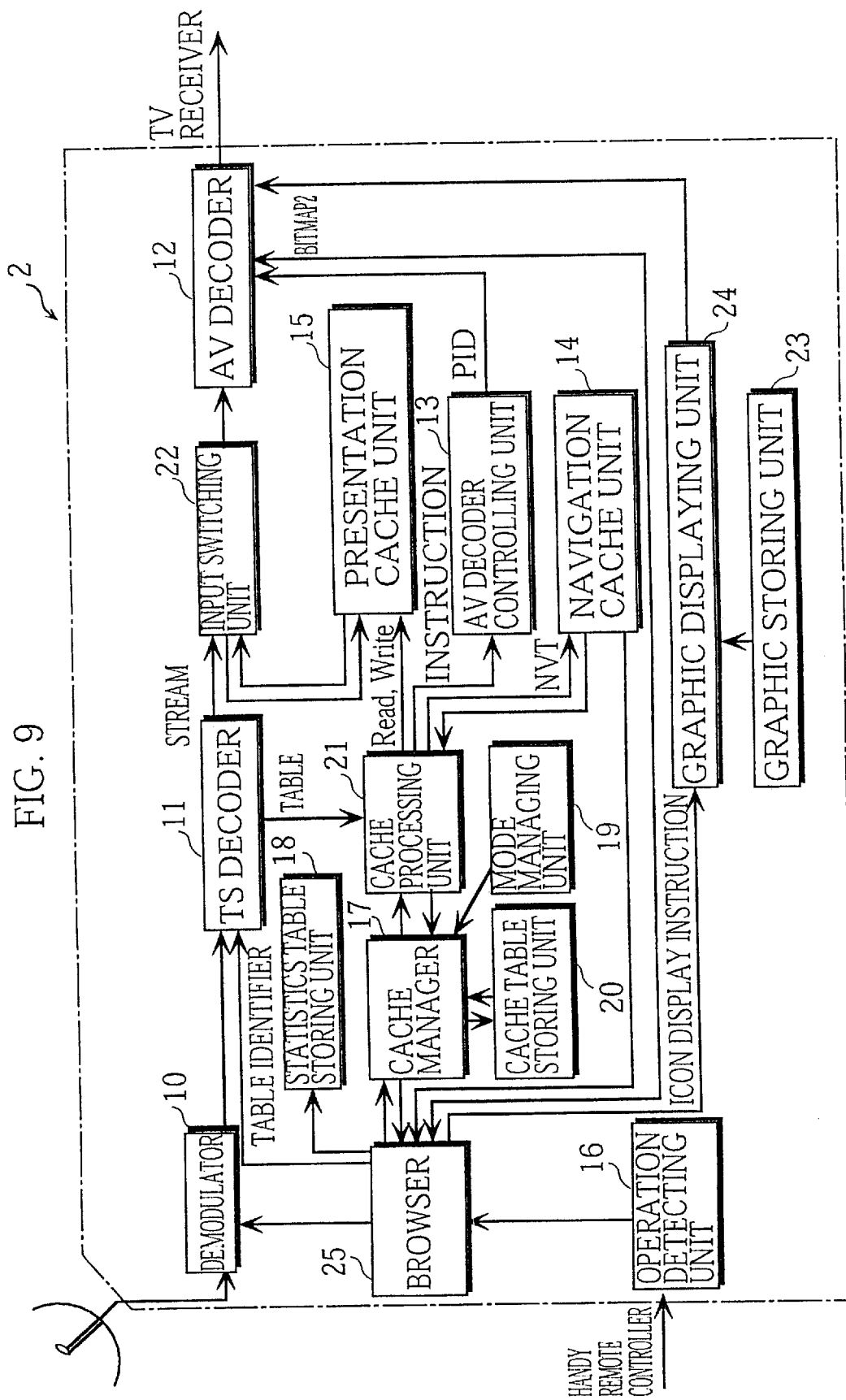
FIG. 9 shows the construction of terminal apparatus 2.

The construction of the terminal apparatus is described with reference to FIG. 9. The terminal apparatus is composed of demodulator 10, TS decoder 11, AV decoder 12, AV decoder controlling unit 13, navigation cache unit 14, presentation cache unit 15, operation detecting unit 16, cache manager 17, statistics table storing unit 18, mode managing unit 19, cache table storing unit 20, cache processing unit 21, input switching unit 22, graphic storing unit 23, graphic displaying unit 24, and browser 25.

Demodulator 10 demodulates a carrier wave, which is sent from the broadcasting station and is received by the CS antenna, to obtain transport packets, and outputs the obtained transport packets to TS decoder 11.

TS decoder 11 separates the transport packets which belong to the video elementary stream or the video elementary stream from those output by demodulator 10, and outputs the separated transport packets to input switching unit 22 at the side of AV decoder 12. When a table identifier is specified from browser 25, TS decoder 11 detects a transport packet which has the specified table identifier among the plurality of transport packets of the table substream, and outputs the detected transport packet to cache processing unit 21 at the side of browser 25.

AV decoder 12, when input switching unit 22 outputs a transport packet of video elementary stream or video elementary stream and a PID is specified by the AV decoder controlling unit 13, decodes the transport packet, the video element, and the audio element to generate an AV signal synchronizing them with PCR. In generating the AV signal by decoding, when browser 25 outputs the bit maps included in an NVT and when AV decoder controlling unit 13 instructs AV decoder 12 to superimpose the bit maps on the image, AV decoder 12 superimposes the bit maps output from browser 25 onto the decoded image, and outputs the combined image to an AV terminal of the TV receiver as the AV signal.

AV decoder controlling unit 13, when browser 25 outputs a PID and an instruction for decoding the video element and audio element corresponding to the PID, instructs AV decoder 12 to decode the video element and the audio element by referring to the PID. When browser 25 outputs an instruction for superimposing the bit maps onto the image of the video element, AV decoder controlling unit 13 instructs AV decoder 12 to superimpose the bit maps onto the image of the video element. AV decoder controlling unit 13 also instructs AV decoder 12 to change the color of a part of the bit maps in display if browser 25 instructs so.

Navigation cache unit 14, which include memories enabling high-speed access, stores, among a plurality of NVTs included in transport streams, every NVT which has bit maps that may be displayed and all the NVTs whose bit maps having been displayed. Navigation cache unit 14 includes storage areas for storing NVTs, the storage areas having sequence numbers 1, 2, 3, 4, 5, and 6 and display history marks for indicating whether the bit maps of the stored NVT are displayed (hit or missed).

FIG. 10A shows the content of navigation cache unit 14 when the interactive screen shown in FIG. 22A is displayed. As shown in FIG. 22A, the interactive screen displays icons indicating "NEW MOVIE INFORMATION," "INTERNET LATEST INFORMATION," "EVENT INFORMATION," and "PROGRAM PREVIEW," waiting for the operator to input instructions for moving the cursor or for determining a selected icon. According to the content of navigation cache unit 14, it is recognized that NVT[1] whose icons are currently displayed has a mark indicating a hit. The drawing also indicates that navigation cache unit 14 has already stored NVT[2], NVT[3], NVT[4], and NVT[5]. Those NVTs are specified by the handler definition table 303 and hyper table 304 of NVT[1]. When the operator determines one out of the icons indicating "NEW MOVIE INFORMATION," "INTERNET LATEST INFORMATION," "EVENT INFORMATION," and "PROGRAM PREVIEW," the corresponding one out of NVTs[2]-[5] is displayed on the screen.

As will be understood from the above description, navigation cache unit 14 stores NVT[2], NVT[3], NVT[4], and NVT[5] whose bit maps may be displayed next after the current screen shown in FIG. 22A.

Figure 22B:
FIG. 22B shows an interactive screen which is an image generated from presentation stream[2] with the icons of NVT[2] superimposed on the image.
Figure 22D:
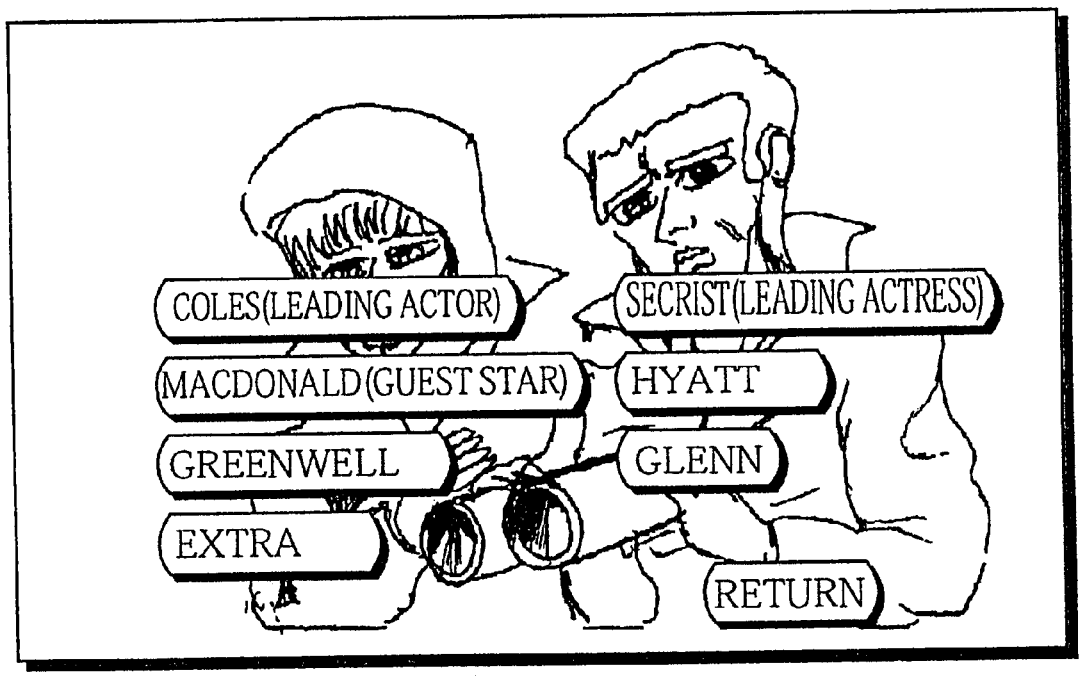
FIG. 22D shows an interactive screen which is an image generated from presentation stream[43] with the icons of NVT[43] superimposed on the image.

FIG. 10D shows the content of navigation cache unit 14 when the interactive screen shown in FIG. 22B is displayed. As shown in FIG. 22B, the interactive screen displays icons indicating "THE TERROR OF THE HUGE TORNADO (DISTRIBUTED BY AAA COMPANY)," "THE RETURN OF THE MONSTROUS DINOSAURS (DISTRIBUTED BY BBB COMPANY)," "SPORTS WARS (DISTRIBUTED BY AAA COMPANY)," and "RETURN," waiting for the operator to input instructions for moving the cursor or for determining a selection. According to the content of navigation cache unit 14, it is recognized that NVT[1] whose bit maps having been displayed and NVT[2] whose bit maps are currently displayed respectively have a mark indicating a hit. The drawing also indicates that navigation cache unit 14 has already stored NVT[11], NVT[12], and NVT[21]. Those NVTs are specified by the handler definition table and hyper table of NVT[2]. That is, navigation cache unit 14 stores NVT[11], NVT[12], and NVT[21] that may be displayed next after the current screen shown in FIG. 22B.

FIG. 10G shows the content of navigation cache unit 14 when the interactive screen shown in FIG. 22C is displayed. The interactive screen including the bit maps of NVT[12] is shown in FIG. 22C. According to the content of navigation cache unit 14, it is recognized that NVT[12] whose bit maps are currently displayed has a mark indicating a hit. The drawing also indicates that navigation cache unit 14 has already stored NVT[41], NVT[42], NVT[43], and NVT[44]. NVTs [41]-[44] are specified by the handler definition table and hyper table of NVT[12]. That is, navigation cache unit 14 stores NVTs [41]-[44] that may be displayed next after the current screen shown in FIG. 22C.

Note that the procedure for storing the above NVTs in navigation cache unit 14, as shown in FIGS. 10A, 10D, and 10G, will be described later.

Presentation cache unit 15 is a memory, as navigation cache unit 14, enabling high-speed accesses. Presentation cache unit 15 stores, among a plurality of presentation streams included in transport streams, every presentation stream which has a possibility of being displayed and all the presentation streams having been displayed. Navigation cache unit 15 includes storage areas for storing presentation streams, the storage areas having sequence numbers 1, 2, 3, 4, 5, and 6 and display history marks for indicating whether each stored presentation stream is displayed (hit or missed). Each of the storage areas also has identification information indicating how image information is stored in the storage area, that is, whether the whole image is stored or whether only the first frame is stored.

FIG. 11A shows the content of presentation cache unit 15 when the interactive screen shown in FIG. 22A is displayed. According to the content of presentation cache unit 15, it is recognized that currently displayed presentation stream[1] has a mark indicating a hit. The drawing also indicates that presentation cache unit 15 has already stored presentation stream[2], presentation stream[3], presentation stream[4], and presentation stream[5]. Those presentation streams are specified by the handler definition table and hyper table of NVT[1]. When the operator determines one out of icons indicating "NEW MOVIE INFORMATION," "INTERNET LATEST INFORMATION," "EVENT INFORMATION," and "PROGRAM PREVIEW," the corresponding one of presentation streams[2]-[5] is displayed on the screen.

As will be understood from the above description, presentation stream cache unit 15 stores presentation stream[2], presentation stream[3], presentation stream[4], and presentation stream[5] that may be displayed next after the current screen shown in FIG. 22A.

FIG. 11D shows the content of presentation cache unit 15 when the interactive screen shown in FIG. 22B is displayed. According to the content, it is recognized that presentation stream[1] having been displayed and presentation stream[2] currently displayed respectively have a mark indicating a hit. The drawing also indicates that presentation cache unit 15 has already stored presentation stream[11], presentation stream[12], and presentation stream[21]. That is, presentation cache unit 15 stores presentation stream[11], presentation stream[12], and presentation stream[21] that may be displayed next after the current screen shown in FIG. 22B. Those presentation streams are specified by the handler definition table and hyper table of NVT[2].

FIG. 11G shows the content of presentation cache unit 15 when the interactive screen shown in FIG. 22C is displayed. According to the content, it is recognized that presentation cache unit 15 has already stored presentation streams[41]-[44]. That is, presentation cache unit 15 stores presentation streams[41]-[44] that may be displayed next after the current screen shown in FIG. 22C. Those presentation streams are specified by the handler definition table and hyper table of NVT[12].

Operation detecting unit 16 receives an infrared ray signal from handy remote controller 4 and detects an operation instruction from the received infrared ray signal. The operation instruction specifies such operations as follows: moving the cursor (when cross key 41 is pressed); and determining an icon (when enter key 43 is pressed). Operation detecting unit 16 outputs the detected operation instruction to browser 25.

Cache manager 17, when an icon is determined on the current screen and the next interactive screen is displayed, obtains a plurality of contents that may be displayed after the "next interactive screen." Cache manager 17, while operation detecting unit 16 waits for an operation instruction to be input on the "next interactive screen," instructs TS decoder 11 to receive presentation streams and NVTs with higher ranks to be displayed which have not been stored in navigation cache unit 14 or presentation cache unit 15, and instructs cache processing unit 21 to store the received presentation streams in presentation cache unit 15 and to store the received NVTs in navigation cache unit 14.

The presentation streams and NVTs that may be displayed next are determined by cache manager 17 as follows: cache manager 17 refers to the hyperlink table of the current NVT to determine the link-target contents, namely interactive screens that may be called from the related icons being displayed, then determines the presentation streams and NVTs belonging to the contents.

The presentation streams and NVTs with higher ranks to be displayed are determined as follows: cache manager 17 determines these presentation streams and NVTs based on (1) the statistics table showing the frequency in determination for each presentation stream and NVT, (2) the "rank" column in the hyperlink table of NVTs, (3) the icon currently in focus.

The presentation streams and NVTs with higher ranks need be determined since some NVTs may include as many icons as cannot be stored in navigation cache unit 14. It is required that as many icons as can be stored in navigation cache unit 14 are selected among those included in such NVTs. This is the same for presentation cache unit 15.

Suppose the maximum number of NVTs and presentation streams that can be stored in navigation cache unit 14 and presentation cache unit 15 is five respectively. In this case, the link-target presentation streams[2]–[5] and NVTs[2]–[5] of NVT[1] can respectively be stored in navigation cache unit 14 and presentation cache unit 15. On the other hand, all of the link-target presentation streams[41]–[49] and NVTs [41]–[49] of NVT[12] cannot be stored in navigation cache unit 14 and presentation cache unit 15. Thus, the necessity for selecting NVTs and presentation streams.

In addition, presentation streams and NVTs which have not been stored in navigation cache unit 14 or presentation cache unit 15 are selected. This is because once a presentation stream or an NVT is stored in each unit, it is not deleted and kept to be stored (this will be described later). Accordingly, this operation is performed not to repeat the same operation of storing presentation streams or NVTs in the units.

The maximum number of NVTs and presentation streams that can be stored in navigation cache unit 14 and presentation cache unit 15 are determined based on the time required to store all the NVTs and presentation streams. This is because NVTs and presentation streams are repeatedly sent and that receiving a desired data takes as much wait time as the cycle period of repetition. The wait time increases as the number of NVTs and presentation streams to be received increases. Therefore, it may happen that the storing of NVTs and presentation streams does not end if the number is too great. As a result, it is desirable to calculate the wait time and to limit the number of NVTs and presentation streams to be stored not to exceed the presumed wait time.

Statistics table storing unit 18 stores the statistics table that shows the frequency in determination for each presentation stream and NVT. FIG. 12 shows a statistics table stored in statistics table storing unit 18. As shown in FIG. 12, the statistics table includes the statistics value for each NVT which is the number of determinations of the past. Note that the mean value on daily basis or time-of-the-day basis or standard deviation may be used instead of the number of determinations.

Mode managing unit 19 manages the cache mode which indicates the best one among: (1) the statistics table, (2) the "rank" column in the hyperlink table, and (3) the icon currently in focus so that the best cache mode is used by cache manager 17 in generating the cache table. Mode managing unit 19 changes the cache mode according to the state of the terminal apparatus.

Cache table storing unit 20 stores the cache table generated by cache manager 17.

Cache manager 17 determines the presentation streams and NVTs to included in the cache table based on (1) the statistics table, (2) the "rank" column in the hyperlink table, and (3) the icon currently in focus, and generates the cache table. FIGS. 13A–13C show cache tables.

FIG. 13A shows a cache table which is generated based on the statistics table shown in FIG. 12. The cache table shows the highest ranking link-target contents among those specified in the hyperlink table of NVT[12].

FIG. 13B shows a cache table which is generated based on the "rank" column in the hyperlink table shown in FIG. 5C. The cache table shows the highest ranking link-target content among those specified in the hyperlink table of NVT [12].

FIG. 13C shows a cache table which is generated based on the icon currently in focus. More specifically, when a plurality of icons are displayed on the current screen, the possible link targets for each icon currently displayed are evaluated by weighting the icon in focus with the highest value and by weighting icons adjacent to the icon in focus with the second highest value.

While the cache table shown in FIG. 13A includes contents[41]–[45], the cache table shown in FIG. 13B includes contents[45], [47], [46], [43], and [44]. This example indicates that the contents of the cache table may greatly change depending on the cache mode.

Cache processing unit 21 manages the start address and end address of each area in navigation cache unit 14 and presentation cache unit 15. Cache processing unit 21 increases or decreases the capacity of each area in navigation cache unit 14 and presentation cache unit 15 according to the size of the NVT or the presentation stream to be stored in the area. In doing so, cache processing unit 21 also performs writing, reading, or a garbage collection.

In the writing, cache processing unit 21 writes an NVT output from TS decoder 11 and a presentation stream output from input switching unit 22 respectively in navigation cache unit 14 and presentation cache unit 15 at areas closer to the start of each unit.

Cache processing unit 21, on receiving a read request from cache manager 17, reads the requested NVT or presentation stream from navigation cache unit 14 or presentation cache unit 15, then outputs the read NVT to browser 25 and the read presentation stream to input switching unit 22.

In the garbage collection, cache processing unit 21 puts a mark indicating a hit on a presentation stream or an NVT when the presentation stream or the NVT is displayed; cache processing unit 21 deletes the rest of the presentation streams or NVTs. When free areas exist between the areas for the hit presentation streams or NVTs, cache processing unit 21 moves the hit presentation streams or NVTs so that free areas are arranged in sequence.

Input switching unit 22 transfers the transport packets of the video elementary stream and the video elementary stream received by TS decoder 11 to AV decoder 12. Input switching unit 22 transfers the transport packets of the video elementary stream and the video elementary stream to presentation cache unit 15 when Input switching unit 22 receives a switch instruction from cache manager 17 for switching the transfer target from AV decoder 12 to presentation cache unit 15.

Input switching unit 22, on receiving a switch instruction from cache manager 17 for using the transport packets in presentation cache unit 15, reads the transport packets from presentation cache unit 15 and transfers the read transport packets to AV decoder 12.

Graphic storing unit 23 stores the bit map for informing the operator of a display break. In this embodiment, the bit map represents a character sequence indicating "WAIT FOR A MOMENT."

Graphic displaying unit 24 outputs the character sequence indicating "WAIT FOR A MOMENT" stored in graphic storing unit 23 to AV decoder 12 when there is no NVT with a bit map that can be displayed.

Browser 25 fetches PIDs of link-target video element and audio element by referring to the hyperlink table and PMT based on the above procedures: <Specifying Link-Target NVT>, <Specifying Link-Target Video Element>, and <Specifying Link-Target Audio Element>, and outputs the fetched PIDs to AV decoder 12 via AV decoder controlling unit 13. Browser 25 also instructs AV decoder 12 to decode the video element and audio element related to the fetched PIDs to generate one AV signal.

Browser 25, when TS decoder 11 outputs a transport packet of the NVT sub-stream, fetches bit maps from the transport packet and outputs the bit maps to AV decoder 12, with an instruction for combining the bit maps with the image. Browser 25 executes a processing program included in the navigation information. With this execution, the bit maps are displayed on the screen. Browser 25 instructs AV decoder controlling unit 13 to change the color of icons when the operator performs a cursor move operation.

Now, the operation of the terminal apparatus is described below with reference to flowcharts shown in FIGS. 14–17 on cache manager 17 and in FIGS. 18–21 on browser 25. This is because cache manager 17 and browser 25 take important parts among the above mentioned components in the operation of the terminal apparatus which is mainly achieved by software.

Figure 14:
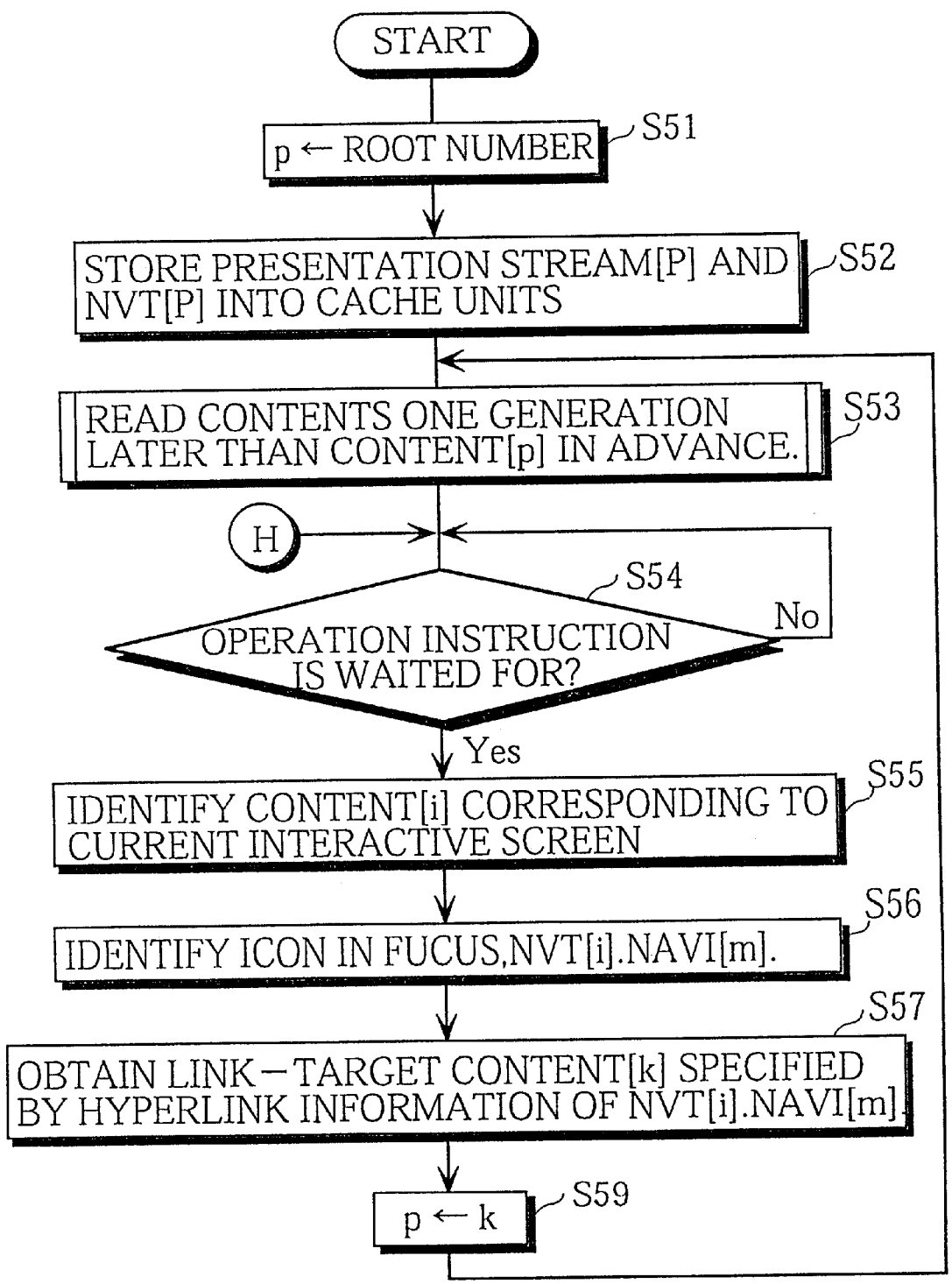
FIG. 14 shows the main flowchart of the operation of cache manager 17.

In step S51 of the flowchart shown in FIG. 14, cache manager 17 sets variable p to the root number. Here, the variable p indicates an index number of a "content," NVT, video element, or audio element to be read, and the root number indicates an index number of a "content," NVT, video element, or audio element which is at the root of the tree structure which is uniquely defined by PAT and PMT. In the present example shown in FIG. 7, the root number is specified as "1".

Suppose variable p is set to "1" in step S51. In step S52, demodulator 10 and TS decoder 11 receive presentation stream[p] and NVT[p] and store them in presentation cache unit 15 and navigation cache unit 14 respectively.

Figure 15:
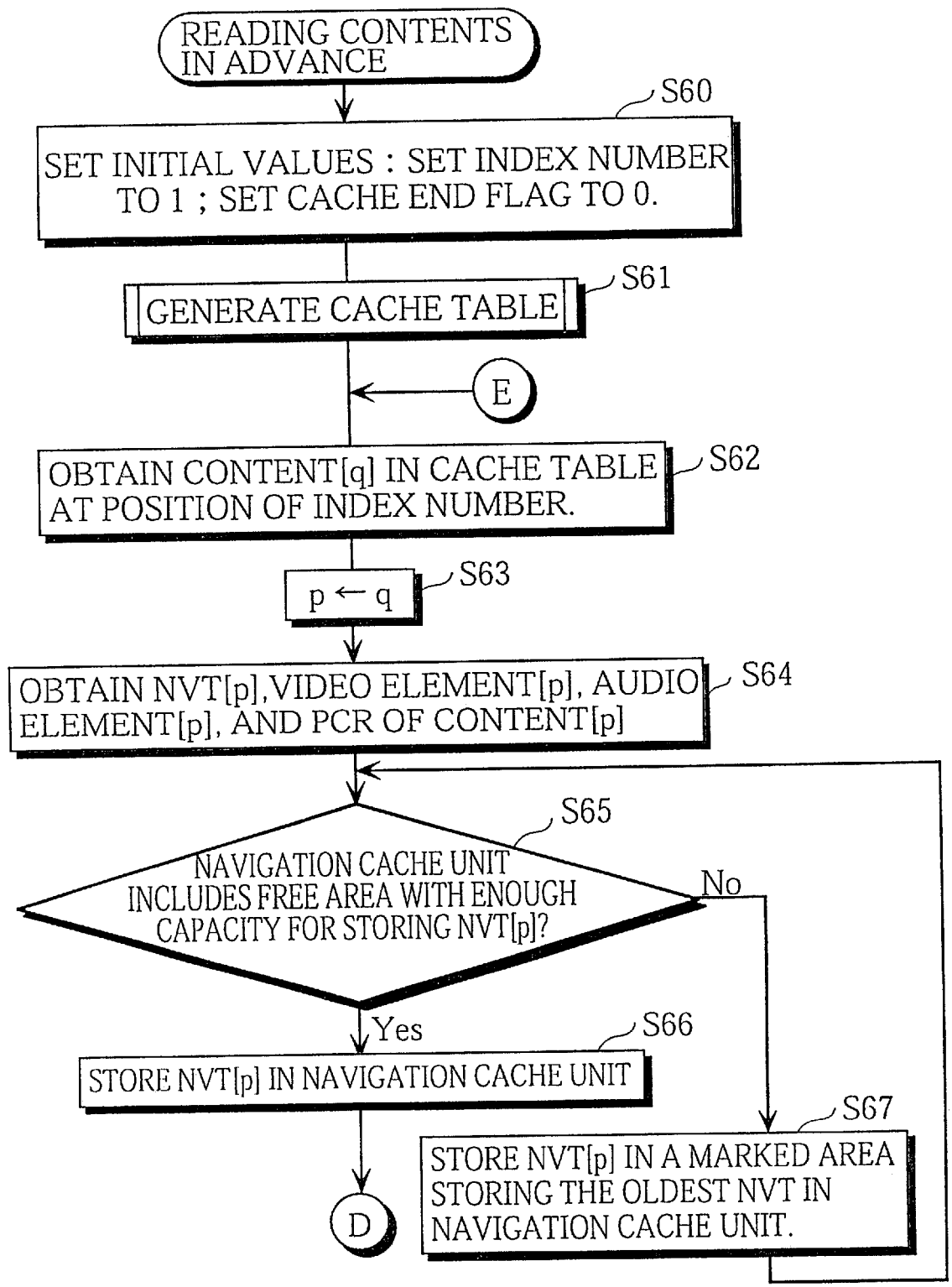
FIG. 15 shows the flowchart of cache manager 17 in reading contents in advance.
Figure 16:
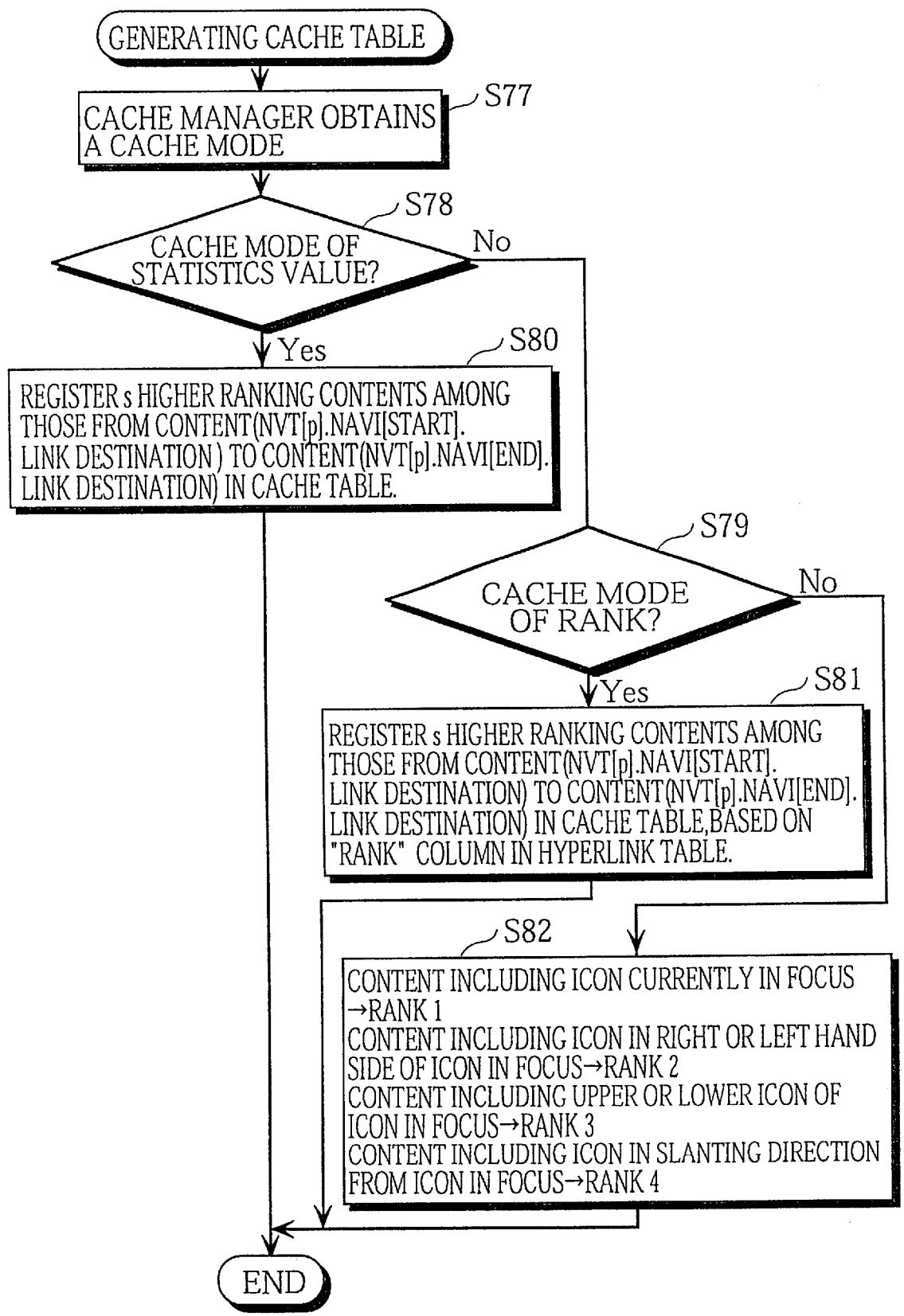
FIG. 16 shows the flowchart of cache manager 17 in generating the cache table.
Figure 17:
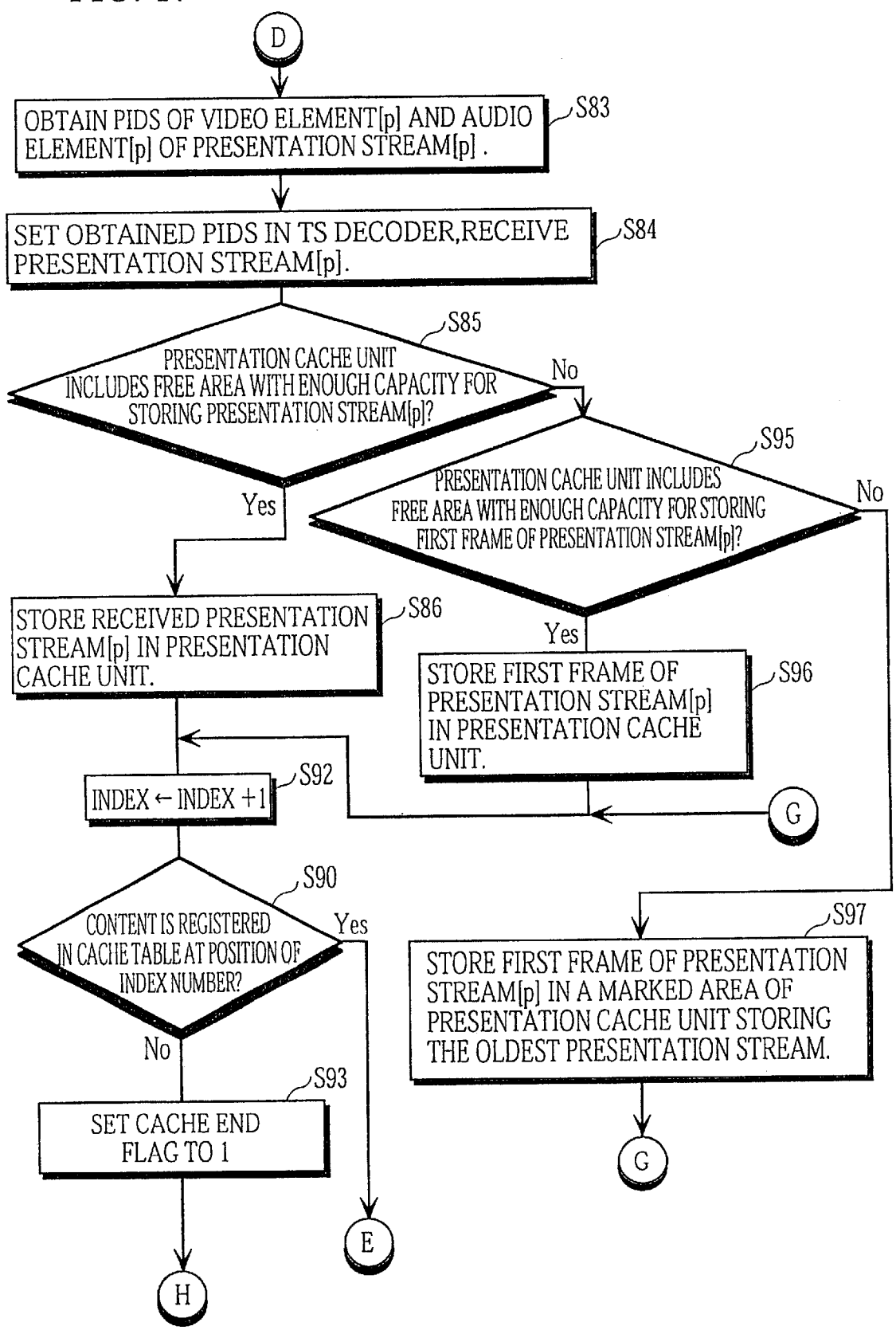
FIG. 17 shows the flowchart of cache manager 17 in reading contents in advance.

Step S53 is described in detail in the flowchart shown in FIG. 15. Note that the flowcharts shown in FIGS. 15–17 show processing procedures for the contents one generation later than content [p]. Here, "the contents one generation later than content[p]" indicates that content[p] links to "the contents one generation later than content[p]" in the tree structure in which a content is linked from the NVT of the previous content. In this case, contents one generation later than content[1] are contents[2], [3], [4], and [5]. Similarly, contents two generations later than content[1] are contents [11], [12], [21], [22], [23], [32]. . . , as shown in FIG. 7.

In step S60 of FIG. 15, initial values are set for the index number and the cache end flag. Here, index number is a variable specifying each content in the cache table. Suppose in the present embodiment, the initial value of the index number is set to "1." When the cache end flag is "1," it indicates that the NVT and presentation stream have been stored. When the cache end flag is "0," it indicates that the NVT and presentation stream have not been stored. Suppose in the present embodiment, the initial value of the cache end flag is set to "1." Note that in the following description, each of a plurality pieces of information included in one NVT is represented as "NVT.NAVI."

Step S61 is described in detail in the flowchart shown in FIG. 16.

In step S77 of FIG. 16, cache manager 17 obtains a cache mode which is managed by mode managing unit 19.

In step S78, it is judged whether the cache mode is that of statistics value. If it is judged as yes, control goes to step S80. In step S80, s higher ranking contents among those ranging from content(NVT[p].NAVI[START].link destination) to content(NVT[p].NAVI[END].link destination) are registered in the cache table, based on the statistics value.

If it is judged as no in step S78, control goes to step S79. In step S79, it is judged whether the cache mode is that of the "rank" column in the hyperlink table. If it is judged as yes, control goes to step S81. In step S81, s higher ranking contents among the contents from content(NVT[p].NAVI [START].link destination) to content (NVT [p].NAVI [END].link destination) are registered in the cache table, based on the "rank" column in the hyperlink table.

If it is judged as no in step S79, control goes to step S82. In step S82, the cache table is generated, in which: a content including the icon currently in focus is determined as rank 1; a content including an icon in the right or left hand side of the icon in focus is determined as rank 2; a content including an upper or lower icon of the icon in focus is determined as rank 3; and a content including an icon in a slanting direction from the icon in focus is determined as rank 4.

Note that in an initial stage after the terminal apparatus has been activated, a substantially effective ranking cannot be expected for the cache modes of statistics value and the icon currently in focus. Accordingly, the initial cache mode is set to that of the "rank" column in the hyperlink table by mode managing unit 19. Thus, in the present embodiment, it is judged as no in step S78 and yes in step S79, and control goes to step S81.

In step S81, s higher ranking contents among the contents from content(NVT[p].NAVI[START]link destination) to content(NVT[p].NAVI[END].link destination) based on the "rank" column in the hyperlink table are registered in the cache table. More specifically, four higher ranking contents among the contents from content(NVT[1] NAVI[START].content[2]) to content(NVT[p]NAVI[END] content[5]), determined based on the "rank" column in the hyperlink table, namely contents[2]–[5], are registered in the cache table in the order of the ranking. From steps of the flowchart shown in FIG. 16, control returns to step S62 in the flowchart of FIG. 15.

In step S62, content[q] in the cache table at the position of the index number is obtained. Suppose the cache table generated through the procedures of FIG. 16 includes contents[2], [3], [4], and [5]. Since in this case, the index number is "1," the first content in the cache table, namely, content[2] is obtained by cache manager 17. Then, in step S63, variable q is substituted for variable p. In step S64, NVT[p], video element[p], audio element[p], and the PCR of content[p] are obtained.

In step S65, it is judged whether navigation cache unit 14 includes a free area with enough capacity for storing NVT [p]. If not, control goes to step S67. In step S67, NVT[p] is stored in a marked area storing the oldest NVT. In the present case, since variable p is "2" and navigation cache unit 14 includes a free area with enough capacity for storing NVT[2], it is judged as yes in step S65, allowing the control to go to step S66. In step S66, NVT[2] is stored in navigation cache unit 14.

In step S83 in the flowchart of FIG. 17, the PIDs of video element[p] and audio element[p] of presentation stream[p] are obtained. Then, in step S84, the obtained PIDs are set in the TS decoder. input switching unit 22 changes the destination of the output from input switching unit 22 to presentation cache unit 15, then Video element[p] and audio element[p] are output to input switching unit 22. In this way, transport packets of the video elementary stream and video elementary stream start to be received. Cache manager 17 judges whether presentation cache unit 15 includes a free area with enough capacity for storing presentation stream[p] in step S85.

In the present case, since variable p is "2," and presentation cache unit 15 includes a free area with enough capacity for storing NVT[2], it is judged as yes in step S85, allowing the control to go to step S86. In step S86, cache manager 17 stores presentation stream[2] in presentation cache unit 15.

If it is judged as no in step S85, control goes to step S95. In step S95, it is judged whether presentation cache unit 15 includes a free area with enough capacity for storing the first frame of presentation stream[p]. If judged as yes, control goes to step S96. In step S96, the first frame is stored in presentation cache unit 15.

If judged as not in step S95, control goes to step S97. In step S97, the first frame of presentation stream[p] is stored in a marked area of presentation cache unit 15 storing the oldest presentation stream, then control goes to step S92.

As will be understood from the above description, as many whole presentation streams as possible are stored in presentation cache unit 15 if presentation cache unit 15 has enough capacity; only the first frames of presentation streams are stored in presentation-cache unit 15 if presentation cache unit 15 does not have enough space for storing a whole presentation stream.

Accordingly, high ranking presentation streams are stored in presentation cache unit 15 while presentation cache unit 15 has enough capacity. That means the whole video elements of the high ranking presentation streams are stored in presentation cache unit 15. In contrast, for low ranking presentation streams, only the first frames the video elements of the low ranking presentation streams are stored in presentation cache unit 15. This is because there is a low possibility for the low ranking presentation streams to be displayed.

In step s92, the index number is incremented by one. In step S90, it is judged whether a content is registered in the cache table at the position of the index number. If judged as yes, control goes to step S93 in which the cache end flag is set to "1," then control returns to step S54. If judged as yes in step S90, control goes to step S62 to enter the second cycle of the procedure.

In step S62 of the second cycle, content[q] in the cache table at the position of the index number is obtained. In the present case, the index number is currently "2" since the value has been incremented by one in step S92. Accordingly, the second content in the cache table, namely, content[3] is obtained here. Then, in step S63, variable q (currently, 3) is substituted for variable p. In step S64, NVT[3], video element[3], audio element[3], and the PCR of content[3] are obtained.

Suppose in step S66, NVT[3] is stored in navigation cache unit 14 as the third NVT. Also suppose presentation stream [3] including video element[3] and audio element[3] is stored in presentation cache unit 15 as the third presentation stream. The index number is incremented by one again in step S92, then control goes to step S62 of the third cycle.

In step S62 of the third cycle, content[q] in the cache table at the position of the index number is obtained. Since the index number is currently "3," the third content in the cache table, namely, content[4] is obtained here. Then, in step S63, variable q (currently, 4) is substituted for variable p. Then, in step S64, NVT[4], video element[4], audio element[4], and the PCR of content[4] are obtained.

Suppose in step S66, NVT[4] is stored in navigation cache unit 14 as the fourth NVT. Also suppose presentation stream[4] including video element[4] and audio element[4] is stored in presentation cache unit 15 as the fourth presentation stream. The index number is incremented by one again in step S92, then control goes to step S62 of the fourth cycle.

In step S62 of the fourth cycle, content[q] in the cache table at the position of the index number is obtained. Since the index number is currently "4," the fourth content in the cache table, namely, content[5] is obtained here. Then, in step S63, variable q (currently, 5) is substituted for variable p. Then, in step S64, NVT[5], video element[5], audio element[5], and the PCR of content[5] are obtained.

Suppose in step S66, NVT[5] is stored in navigation cache unit 14 as the fifth NVT. Also suppose presentation stream [5] including video element[5] and audio element[5] is stored in presentation cache unit 15 as the fifth presentation stream. The index number is incremented by one again in step S92. This time, it is judged as no in step S90. As a result, control goes to step S93 in which the cache end flag is set to "1," and control returns to step S54 shown in FIG. 14.

In step S54, it is judged whether an input of an operation instruction is waited for on the interactive screen.

If judged as yes in step S54, control goes to step S55. In step S55, content[i] corresponding to the current interactive screen is identified. The variable i indicates the index number of the content currently displayed in the interactive screen. Then, in step S56, the icon being in fucus, namely, "NVT[i].NAVI[m]" is identified, where variable m indicates an index number of a piece of navigation information including a bit map of the icon being in focus in NVT [i]. Suppose the interactive screen shown in FIG. 22A is currently displayed and the icon indicating "NEW MOVIE INFORMATION" is in focus. Under this condition, content [1] is identified in step S55, and "NVT[1].NAVI[1]" is identified in step S56.

In step S57, a link-target content[k] specified by the hyperlink information of navigation information "NVT[i].NAVI[m]" is obtained. Then, in step S59, variable k is substituted for variable p. Control returns to step S53 so that "the contents one generation later than content[p]" are read.

In the present case, link-target content[2] specified by the hyperlink information of navigation information "NVT[1].NAVI[1]" is obtained. Then, in step S59, variable k (currently, 2) is substituted for variable p. Control returns to step S53 so that "the contents one generation later than content[2]" are read. In step S53, contents[11], [12], and [21] are read.

Now, the operation of the terminal apparatus is described with reference to the flowcharts shown in FIGS. 18–21 related to browser 25.

Figure 18:
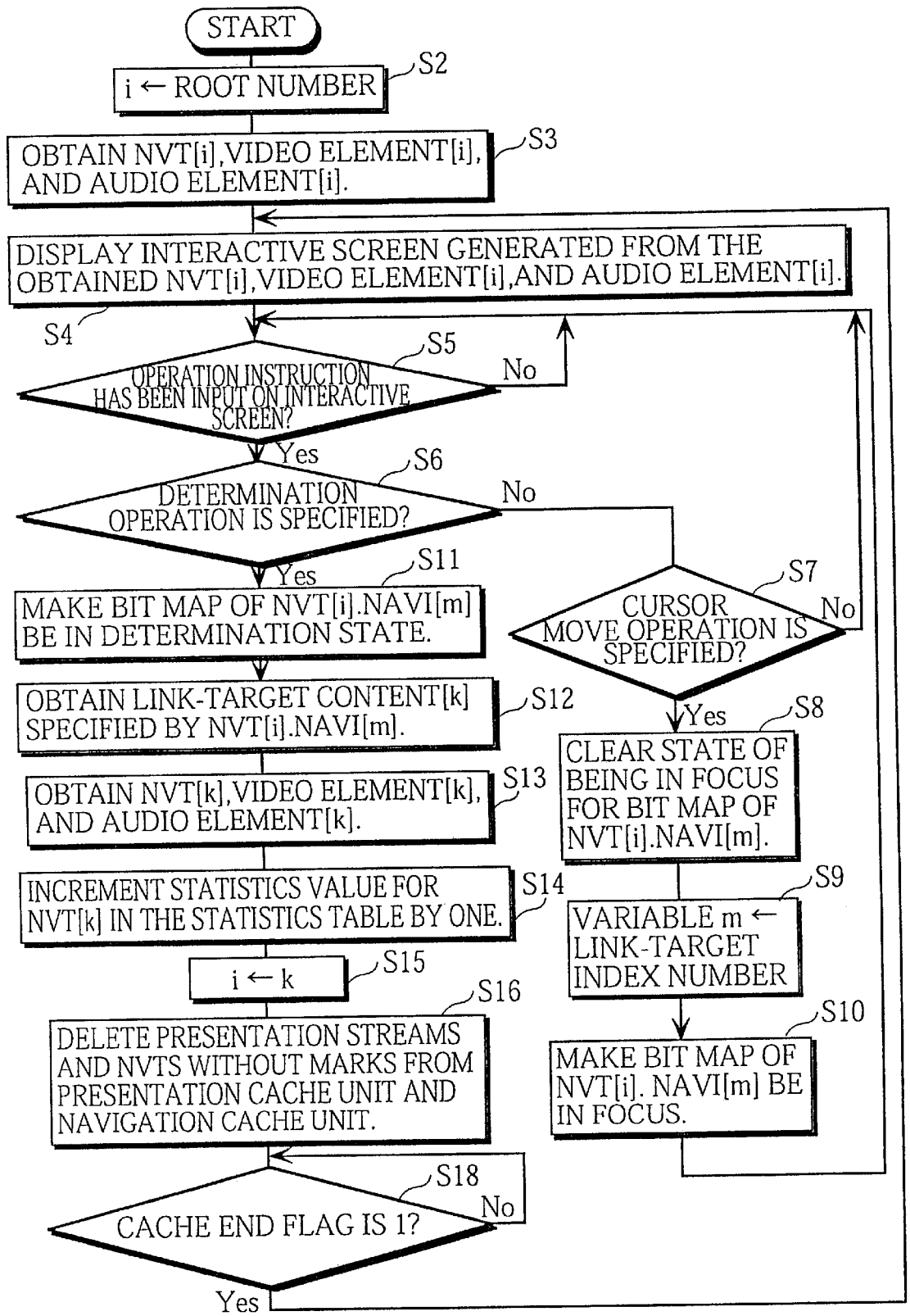
FIG. 18 shows the main flowchart of the operation of browser 25.

After the terminal apparatus is activated, browser 25 sets variable i to the root number in step S2 shown in FIG. 18. In step S3, NVT[i], video element[i], and audio element[i] are obtained. In step S4, the interactive screen generated from the obtained NVT[i], video element[i], and audio element[i] is displayed.

Figure 19:
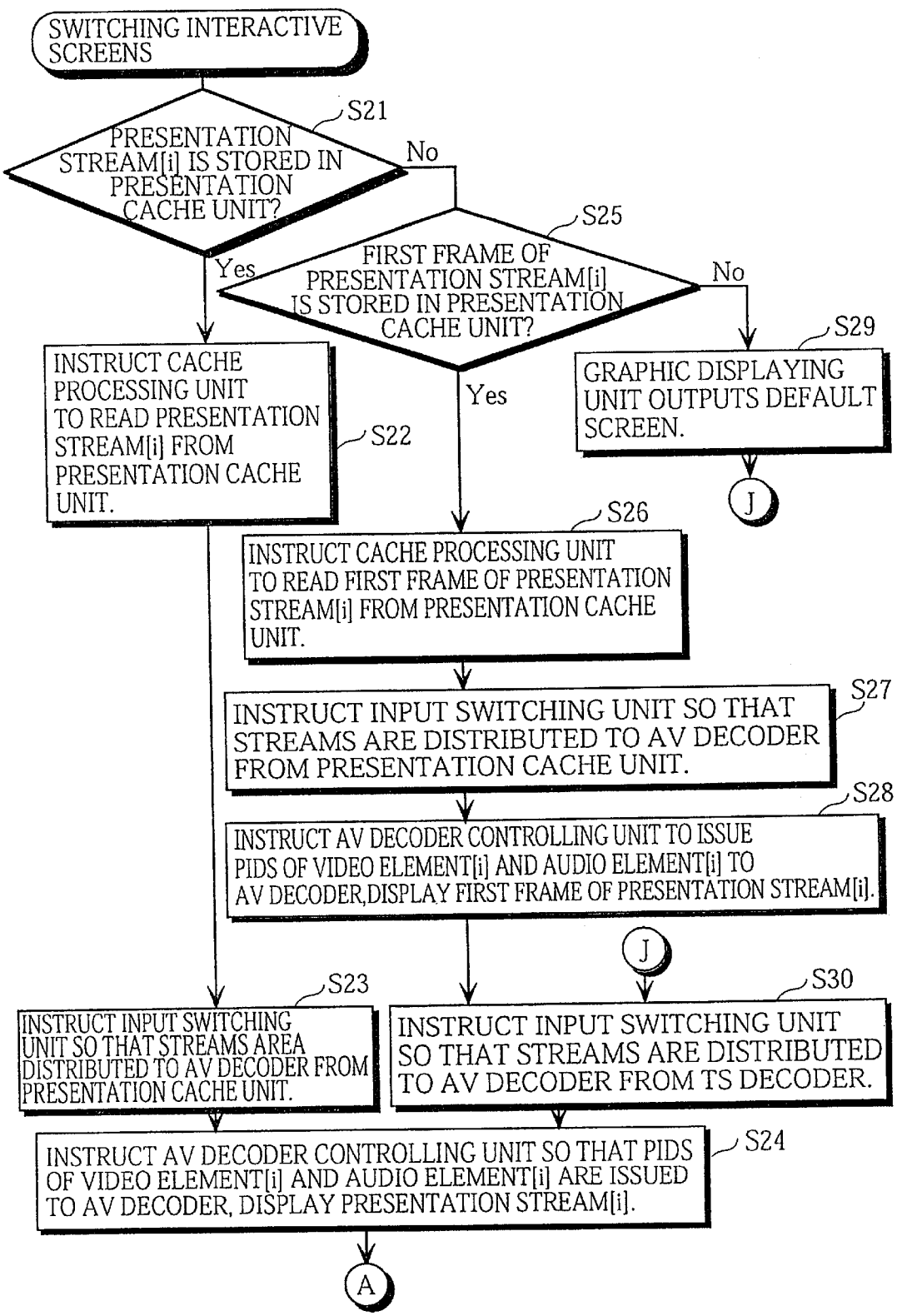
FIG. 19 the flowchart of browser 25 in switching interactive screens.

Step S4 is described in detail in the flowchart shown in FIG. 19.

In the flowchart shown in FIG. 19, browser 25 operates for switching the interactive screen at high speed.

In step S21, it is judged whether presentation stream[i] is stored in presentation cache unit 15. If judged as yes, control goes to step S22. In step S22, cache processing unit 21 is instructed to read presentation stream[i] from presentation cache unit 15. In step S23, input switching unit 22 is instructed so that streams are distributed to AV decoder 12 from presentation cache unit 15.

If judged as no in step S21, control goes to step S25. In step S25, it is judged whether the first frame of presentation stream[i] is stored in presentation cache unit 15. If judged as yes, control goes to step S26. In step S26, cache processing unit 21 is instructed to read the first frame of presentation stream[i] from presentation cache unit 15. In step S27, input switching unit 22 is instructed so that streams are distributed to AV decoder 12 from presentation cache unit 15. In step S28, AV decoder controlling unit 13 is instructed to issue the PIDs of video element[i] and audio element[i] to AV decoder 12, and the first frame of presentation stream[i] in presentation cache unit 15 is displayed.

If it is judged as no in step S25, control goes to step S29. In step S29, graphic displaying unit 24 outputs the character sequence indicating "WAIT FOR A MOMENT" stored in graphic storing unit 23 to AV decoder 12 so that the character sequence is displayed on the screen, the screen being displayed as a default screen.

In step S30, input switching unit 22 is instructed so that streams are distributed to AV decoder 12 from TS decoder 11.

In step S24, AV decoder controlling unit 13 is instructed so that the PIDs of video element[i] and audio element[i] are issued to AV decoder 12. With such an arrangement, AV decoder 12 decodes either of the presentation stream read from presentation cache unit 15 and the presentation stream received by TS decoder 11 using the PIDs sent from AV decoder controlling unit 13.

Figure 20:
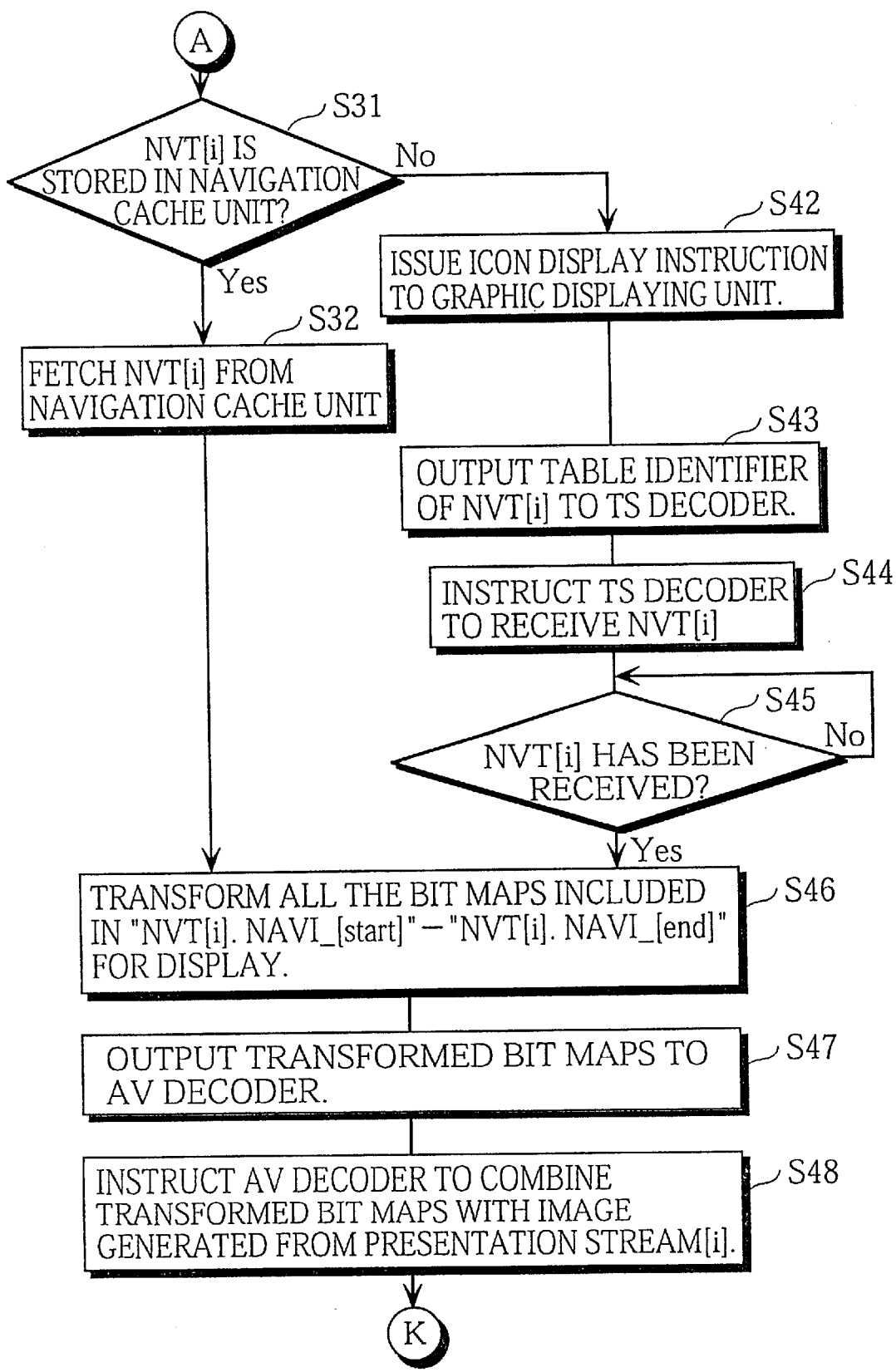
FIG. 20 the flowchart of browser 25 in switching interactive screens.
Figure 21:
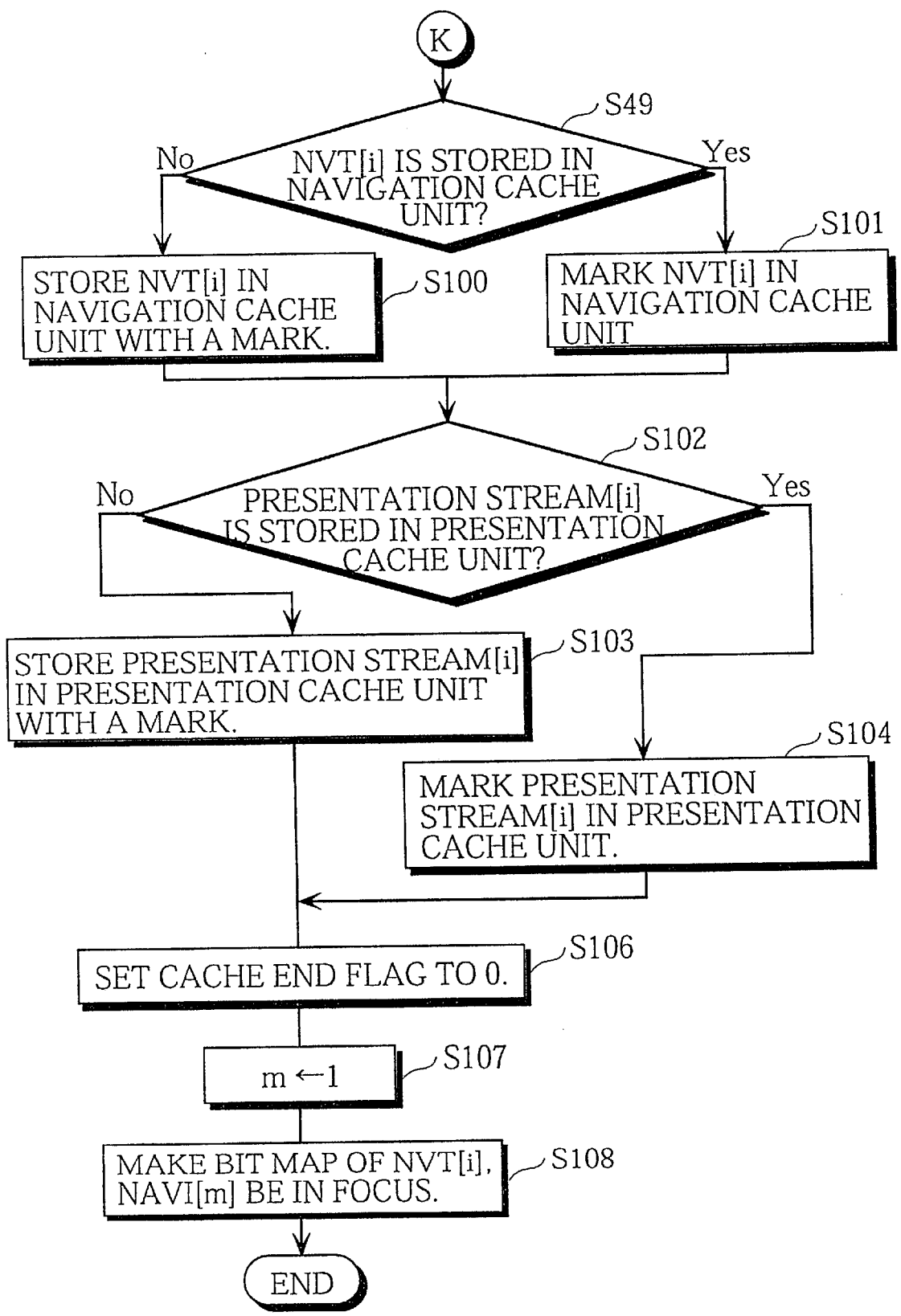
FIG. 21 the flowchart of browser 25 in switching interactive screens.

In step S31 shown in FIG. 20, it is judged whether NVT[i] is stored in navigation cache unit 14. If judged as yes, control goes to step S32. In step S32, NVT[i] is fetched from navigation cache unit 14.

If judged as not in step S31, control goes to step S42. In step S42, an icon display instruction is issued to graphic displaying unit 24. Graphic displaying unit 24, on receiving this instruction, displays the character sequence "WAIT FOR A MOMENT" stored in graphic storing unit 23, as the default screen.

In step S43, the table identifier of NVT[i] is output to the TS decoder. In step S44, the TS decoder is instructed to receive NVT[i]. In step S45, it is judged whether NVT[i] has been received. If judged as yes, control goes to step S46.

In step S46, all the bit maps included in "NVT[i].NAVI [start]"-"NVT[i].NAVI_[end]" are transformed for display. In step S47, the transformed bit maps are output to the AV decoder. In step S48, the AV decoder combines the transformed bit maps with the image which is the decoded presentation stream[i]. In step S49 shown in FIG. 21, it is judged whether NVT[i] has been stored in navigation cache unit 14. If judged as yes, control goes to step S101. In step S101, the NVT[i] stored in navigation cache unit 14 is marked. If judged as no in step S49, control goes to step S100 in which NVT[i] is stored in navigation cache unit 14 with a mark.

In step S102, it is judged whether presentation stream[i] has been stored in presentation cache unit 15. If judged as yes, control goes to step S104. In step S104, the presentation stream[i] stored in presentation cache unit 15 is marked. If judged as no in step S102, control goes to step S103 in which presentation stream[i] is stored in presentation cache unit 15 with a mark.

In step S106, the cache end flag is set to 0. In step S107, variable m is set to 1. In step S108, the bit map of NVT[i].NAV[m] is made to be in focus. Note that in the present embodiment, a bit map specified by the first piece of navigation information is made to be in focus. However, a bit map specified by any piece of navigation information may be made to be in focus. Control returns to step S5 shown in FIG. 18.

In step S5, it is judged whether an operation instruction has been input on the interactive screen. If judged as yes in step S5 by operation detecting unit 16, control goes to step S6. In step S6, it is judged whether the operation specified by the operation instruction is a determination operation. If judged as no, control goes to step S7. In step S7, it is judged whether the operation specified by the operation instruction is a cursor move operation.

If judged as yes, control goes to step S8. In step S8, the state of being in focus is cleared for the bit map of NVT[i].NAVI[m]. In step S9, variable m is updated to indicate a link-target index number. In step S10, the bit map of NVT[i] NAVI [m] is made to be in focus. Control returns to step S5.

If it is judged that the input operation is the determination operation in step S6, control goes to step S11. In step S11, the bit map of NVT[i].NAVI[m] is made to be in the determination state. In step S12, a link-target content[k] specified by NVT[i].NAVI[m] in the hyperlink table is obtained. In step S13, NVT[k], video element[k], and audio element[k] are obtained. In step S14, the statistics value for NVT[k] in the statistics table is incremented by one. In step S15, "k" is substituted for "i." In step S16, the presentation streams and NVTs without marks are respectively deleted from presentation cache unit 15 and navigation cache unit 14. In step S18, it is judged whether the cache end flag is "1." Control stays at step S18 until the cache end flag is "1." This indicates that the next operation is not started until cache manager 17 completely stores the presentation streams and NVTs one generation later into presentation cache unit 15 and navigation cache unit 14 respectively. In case the reproduction of the presentation stream ends while the next operation is not started in the above process, browser 25 repeats reproduction of the presentation stream, keeps on displaying a still image of the last frame or the like. If it is judged as yes in step S18, control returns to S4.

Now, the operation on the contents shown in FIG. 7 is described, based on the above flowcharts.

FIG. 22A shows the interactive screen generated from NVT[1], video element[1], and audio element[1] in step S4 and is displayed on TV receiving unit 3. The interactive screen is composed of a shot image generated from presentation stream[1] and several icons superimposed on the shot image. The voice of an announcer is output. While the interactive screen is displayed, cache manager 17 obtains contents[2], [3], [4], and [5] specified in the handler definition table 302 and hyperlink table 304 of NVT[1]. Then, presentation streams [2], [3], [4], and [5] are stored in presentation cache unit 15 via demodulator 10 and TS decoder 11. Similarly, NVTs[2], [3], [4], and [5] are stored in navigation cache unit 14 via demodulator 10 and TS decoder 11.

Currently displayed presentation stream[1] and NVT[1] are marked respectively in presentation cache unit 15 and navigation cache unit 14, in steps 101 and 104. FIG. 10A and FIG. 11A respectively show the contents of navigation cache unit 14 and presentation cache unit 15 after the above operation.

When the operator determines an icon indicating "NEW MOVIE INFORMATION" on the current screen, the processing goes through steps S11 to S18 and returns to step S4 in which browser 25 displays the interactive screen generated from NVT[2], video element[2], and audio element[2]. FIG. 22B shows the interactive screen at this stage.

Currently displayed presentation stream[2] and NVT[2] are marked respectively in presentation cache unit 15 and navigation cache unit 14, in steps 101 and 104. FIG. 10B and FIG. 11B respectively show the contents of navigation cache unit 14 and presentation cache unit 15 after the above operation.

After presentation stream[2] and NVT[2] are displayed as described above, areas without marks are deleted from navigation cache unit 14 and presentation cache unit 15. FIGS. 10C and 11C respectively show the contents of navigation cache unit 14 and presentation cache unit 15 after the above operation.

While the interactive screen is displayed, cache manager 17 obtains contents[11], [12], and [21] specified in the hyperlink information of NVT[2]. Then, presentation streams[11], [12], and [21] are stored in presentation cache unit 15 via demodulator 10 and TS decoder 11. Similarly, NVTs[11], [12], and [21] are stored in navigation cache unit 14 via demodulator 10 and TS decoder 11. FIGS. 10D and 11D respectively show the contents of navigation cache unit 14 and presentation cache unit 15 after the above operation.

Suppose the operator determines an icon indicating "THE TERROR OF THE HUGE TORNADO (DISTRIBUTED BY AAA COMPANY)." Then, the processing goes through steps S11 to S18 and returns to step S4 in which browser 25 displays the interactive screen generated from NVT[12], video element[12], and audio element[12]. FIG. 22C shows the interactive screen displayed at this stage.

Currently displayed presentation stream[12] and NVT [12] are marked respectively in presentation cache unit 15 and navigation cache unit 14, in steps 101 and 104. FIG. 10E and FIG. 11E respectively show the contents of navigation cache unit 14 and presentation cache unit 15 after the above operation.

After presentation stream[12] and NVT[12] are displayed as described above, areas without marks are deleted from navigation cache unit 14 and presentation cache unit 15. FIGS. 10F and 11F respectively show the contents of navigation cache unit 14 and presentation cache unit 15 after the above operation.

While the interactive screen is displayed, cache manager 17 obtains contents[41]–[49] specified in the hyperlink information of NVT[12]. Then, presentation streams[41]–[49] and NVTs[41]–[49] are attempted to be stored respectively in presentation cache unit 15 and navigation cache unit 14. However, as shown in FIGS. 10F and 11F, there are only two free areas in each of the tables. As a result, presentation streams[41] and [42] and NVTs[41] and [42] are stored in two areas, replacing with two oldest presentation streams and NVTs respectively in presentation cache unit 15 and navigation cache unit 14. Presentation streams [43] and [44] and NVTs[43] and [44] are stored in two free areas of presentation cache unit 15 and navigation cache unit 14, respectively. FIGS. 10G and 11G respectively show the contents of navigation cache unit 14 and presentation cache unit 15 after the above operation.

Now, the operation corresponding to the determination of "RETURN" icon is described. Suppose the operator determines an icon indicating "RETURN" in the interactive screen as shown in FIG. 22B. By referring NVT[2], it is determined that the icon is related to the index number 4, and that the link-destination is content[1].

FIG. 10B and FIG. 11B respectively show the contents of navigation cache unit 14 and presentation cache unit 15 at this stage. As will be understood from the tables shown in FIG. 10B and FIG. 11B, NVT[1] and presentation stream[1], namely, the above link targets, have already been stored. Accordingly, NVT[1] and presentation stream[1] can immediately be obtained from these tables and displayed as the interactive screen as shown in FIG. 22A.

When the operator determines an icon indicating "NEW MOVIE INFORMATION" here, the interactive screen shown in FIG. 22B is immediately displayed since presentation stream[2] and NVT[2] are stored in presentation cache unit 15 and navigation cache unit 14 with marks, respectively. As will be understood from the above description, the construction in which presentation streams and NVTs are stored in presentation cache unit 15 and navigation cache unit 14 with marks achieves the high-speed return to the previous screen responding to the determination of the "RETURN" icon.

As has been described above, the TV broadcasting system of the present embodiment enables an immediate display of an interactive screen since the link-target NVT and presentation stream can immediately be obtained from navigation cache unit 14 and presentation cache unit 15 and displayed, responding to the determination of one icon in the previous screen.

The TV broadcasting system of the present embodiment also enables storage of a plurality of presentation streams and NVTs which have possibility of being displayed next in presentation cache unit 15 and navigation cache unit 14 in advance while the current interactive screen is displayed.

The above operation also has an effect that the operator does not recognize the storing of presentation streams and NVTs since the storage is done while the TV broadcasting system waits for an input of an operation instruction on the currently displayed interactive screen.

<Second Embodiment>

The present embodiment achieves a TV broadcasting system which uses video elements including still pictures, while the TV broadcasting system of the first embodiment uses video elements which include only motion pictures.

Figure 23:
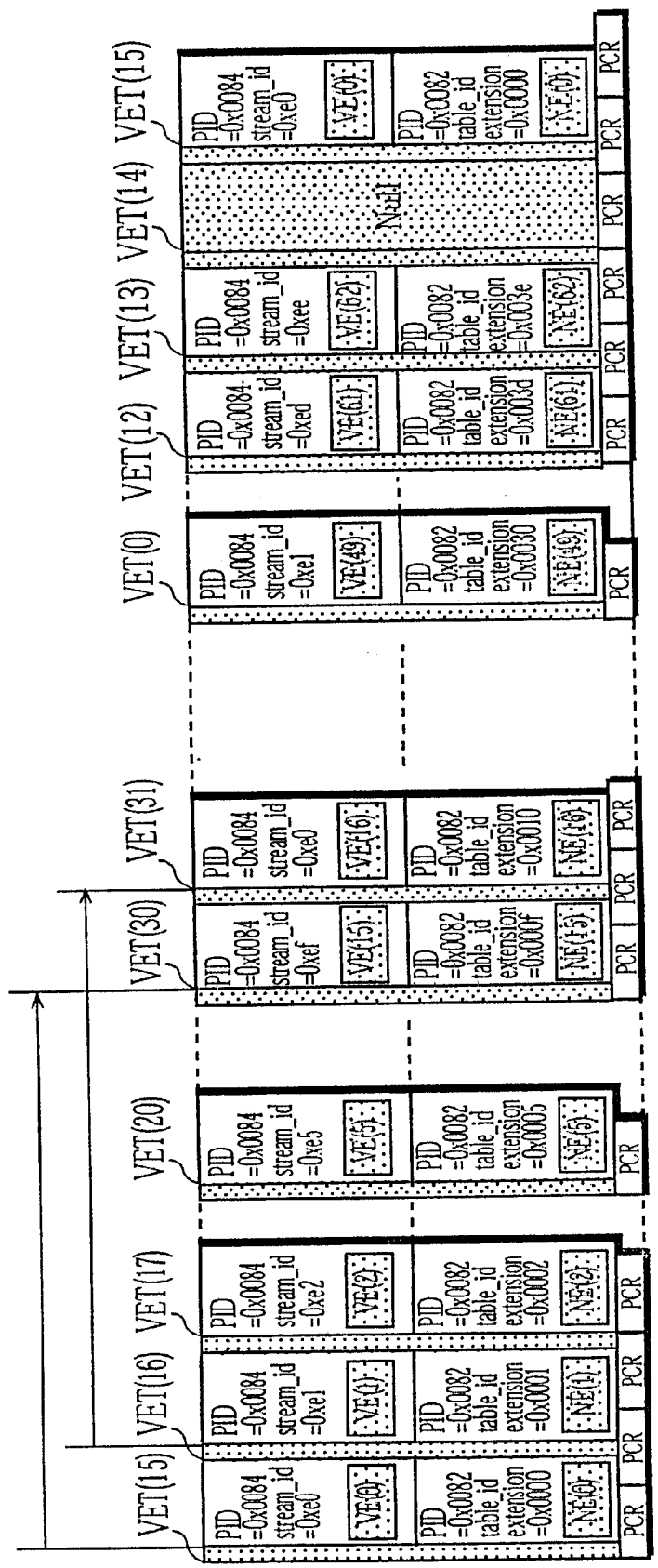
FIG. 23 shows the contents of the transport streams including still pictures.

FIG. 23 shows the contents of the transport streams broadcast in the present embodiment. Each of VE[0], VE[1], VE[2], . . . includes still pictures. While in the first embodiment, each video element has a different PID, in the second embodiment, each video element has a common PID which is "0x0084," as shown in FIG. 23. This is because it is intended in the second embodiment that a large number of still pictures are broadcast and that the length of the PID is not enough for assigning a unique identifier to each video element. Though each video element has a common PID, it has another identifier called "stream_id." In FIG. 23, for example, VE[0] has stream_id "0xe0," and VE[1] has stream_id "0xe1," as well as a common PID, "0x0084."

While in the first embodiment, the transport stream is composed of a sequence of video elements, in the second embodiment, the transport stream includes a private section called video element table (VET) between video elements. As shown in FIG. 23, for example, VET[15] is inserted in immediately before VE[0], VET[16] in immediately before VE[1]. Similarly, the transport stream of the present embodiment includes a private section called audio element table (AET) between the audio elements.

FIG. 24A shows the content of VET[15]. VET[15] includes an identifier called VE_id_extension whose value is "0x0001," which is unique to VET[15]. VET[15] also includes a PID, "0x0083." Though VET[15] is inserted in immediately before VE[0], it has the stream_id "0xef" of VE[15] which is at a position about a dozen VEs away.

FIG. 24B shows the content of VET[16]. VET[16] includes VE_id_extension whose value is "0x0000," which is unique to VET[16]. VET[16] also includes the same PID, "0x0083," as that of VET[15]. Though VET[16] is inserted in immediately before VE[1], it has the stream_id "0xe0" of VE[16] which is at a position about a dozen VEs away. In this way, each VET has the stream_id of a corresponding VE which is at a position a certain number of VEs away.

FIG. 25 shows a content of a hyperlink table in an NVT of the second embodiment. The hyperlink table of the second embodiment differs from that of the first embodiment in that it includes "VE_id_extension" 2547 instead of "VE_comp_tag" and "AE_id_extension" instead of "AE_comp_tag." The "VE_id extension" column and "AE_id_extension" column respectively show a VE_id_ extension of a VET and an AE_id_extension of an AET. For example, "0x0000" and "0x0001" included in "VE_id extension" 2547 shown in FIG. 25 are VE_id_extensions of VET[16] and [15], respectively. This indicates that the hyperlink table defines link-target VETS.

From the above description, the following procedures are required in the second embodiment for changing still pictures.

A VE_id_extension written in hyperlink table→a VET with the VE_id_extension→a stream_id included in the VET→a VE with the stream_id cache manager 17 operates as follows in the second embodiment.

When the operator determines an icon on an interactive screen, cache manager 17 detects an HD_index number corresponding to the determined icon by referring to the object definition table, detects an HL_index number corresponding to the HD_index number by referring to the handler definition table, and detects a VE_id_extension corresponding to the HL_index number by referring to the hyperlink table. Cache manager 17 allows demodulator 10 and TS decoder 11 to receive a VET having the detected VE_id extension among the plurality of VETs included in the transport stream. Cache manager 17 fetches a stream_id and a component_tag from the received VET. Cache manager 17 fetches a PID corresponding to the component_tag from the PMT. Cache manager 17 waits for a VE with the stream_id and the PID to be transmitted. If the VE is transmitted, cache manager 17 receives it.

After receiving a link-target VE in the above procedure, cache manager 17 also receives a link-target AE in a similar procedure. Cache manager 17 instructs input switching unit 22 to store the received VE and AE into presentation cache unit 15 as a presentation stream.

With the above construction, it is possible for the digital satellite broadcasting system, which broadcasts a large number of still pictures, to display interactive screens including a still picture specified as a link destination by a determination operation in another interactive screen. This is achieved by the reference of VETs included between VEs in the transport stream.

The two embodiments described above are examples of the present invention with which best effects are expected. It is also possible to change the embodiments as follows:

(a) In the present embodiments, the highest rank in the navigation information is indicated by integer "1." However, the highest rank may be integer "255" which is the highest value for 8-bit data in binary notation.

(B) In the present embodiments, mode managing unit 19 manages the cache mode in cache manager 17. However, the operator may input an instruction for changing a cache mode to another cache mode. Alternately, an NIT including the cache mode may be transmitted.

(C) In the present embodiments, cache processing unit 21 processes both navigation cache unit navigation cache unit 14 and presentation cache unit 15. However, navigation cache unit navigation cache unit 14 and presentation cache unit 15 may be processed by other two units, respectively.

(D) In the present embodiments, cache manager 17 suspends the reproduction until the cache end flag is set to "1." However, the reproduction may be continued without suspension.

(E) In the present embodiments, cache manager 17 stores each NVT and presentation stream separately in navigation cache unit 14 and presentation cache unit 15 respectively. However, demodulator 10 and TS decoder 11 may receive a plurality of NVTs and presentation streams in a transport stream at each reception so that they are stored in navigation cache unit 14 and presentation cache unit 15 with batch processing.

(F) In the present embodiments, cache processing unit 21 deletes presentation streams or NVTs for effective use of the memory. However, the presentation streams or NVTs may not be deleted and be used again if the memory capacity allows it.

(G) In the present embodiments, presentation streams and NVTs one generation later than the content related to the determined icon are read in advance. However, a certain number of presentation streams and NVTs may be selected from those one generation later and two generations later than the current content and be read in advance.

(H) In the present embodiments, presentation streams or NVTs without marks are deleted. However, presentation streams or NVTs to be deleted may be determined based on the number of times they have been displayed in past, with a certain threshold value.

(I) Presentation cache unit 15 may be deleted from the construction. In such a case, the system operates as follows:

cache manager 17 obtains only NVTs having possibility of being displayed according to a current NVT in navigation cache unit 14 and stores them in navigation cache unit 14 while an input of an operation instruction is waited for on an interactive screen.

When the operator determines an icon on the interactive screen, the link-target content is determined referring to the current NVT.

If the link-target NVT has been stored in navigation cache unit 14, the link-target presentation stream is obtained according to the link-target NVT and is stored in navigation cache unit 14. The NVT and presentation stream are displayed. Such a construction takes more time in displaying the link-target NVT and presentation stream since they are obtained one by one. However, it has a merit of deleting presentation cache unit 15 from the construction. Further, in case the link-target interactive screen is composed of only the bit maps specified by an NVT, the presentation stream need not be obtained. This provides an effect of simplifying the construction and speeding up the display of the interactive screen.

(J) Navigation cache unit 14 may be deleted from the construction, and presentation cache unit 15 may store only presentation streams.

(K) In the second embodiment, VEs including still pictures are identified by using "stream_id." However, different PIDs may be used instead of "stream_id." On the other hand, though in the first embodiment, VEs including motion pictures are identified by using different PIDs, a common PID and "stream_id" may be used instead.

(L) The procedure of the caching manager or the browser may be written in a machine-language program and be recorded in a record medium such as an IC card, optical disc, or floppy disk. The recorded machine-language program is installed on a general-purpose hardware apparatus for use, where the general-purpose hardware apparatus indicates a personal computer which is connected to a parabolic antenna and includes built-in decoder, TS decoder, and AV decoder. Such a personal computer executes the installed machine-language program to achieve the features of the present apparatus described in the first and second embodiments.

(M) In the first embodiment, as many whole presentation streams as possible are stored in presentation cache unit 15. However, only the first frames or representative frames may be stored instead.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A terminal apparatus for interactively switching pieces of presentation data in a system which repeatedly broadcasts m pieces of presentation data and n pieces of navigation data corresponding to the m pieces of presentation data, wherein m and n are each an integer of "1" or higher, the terminal apparatus comprising:

receiving means for receiving one of the m pieces of presentation data;

reproducing means for reproducing the received piece of presentation data;

presenting means for analyzing a piece of navigation data corresponding to the reproduced presentation data to detect a plurality of pieces of link-target presentation data specified by the corresponding piece of navigation data and presenting the detected link-target presentation data to an operator, the plurality of link-target pieces of presentation data being among the m pieces of presentation data excluding the reproduced presentation data;

pre-reading means for allowing the receiving means to receive beforehand s pieces of presentation data among the detected link-target presentation data and t pieces of navigation data corresponding to the s pieces of presentation data, s being an integer satisfying $1 \leq s \leq m$, and t an integer satisfying $1 \leq t \leq n$;

cache means for storing the pre-received s pieces of presentation data and t pieces of navigation data; and reading means for, when the operator selects one among the presented plurality of pieces of link-target presentation data and when the selected presentation data is one of the s pieces of presentation data stored in the cache means, reading the selected presentation data from the cache means and allowing the reproducing means to reproduce the read presentation data.

2. The terminal apparatus of claim 1 further comprising:

judging means for, when the operator selects one among the presented link-target pieces of presentation data, judging whether the selected piece of presentation data is one of the s pieces of presentation data, wherein when the judging means judges that the selected presentation data is not one of the s pieces of presentation data, the receiving means waits until a time when the selected presentation data is broadcast, receives the selected presentation data when the time is reached, and allows the reproducing means to reproduce the received link-target presentation data, and when the judging means judges that the selected presentation data is one of the s pieces of presentation data, the reading means reads the selected presentation data from the cache means before the time is reached, and allows the reproducing means to reproduce the read link-target presentation data.

3. The terminal apparatus of claim 2 further comprising:

default image reproducing means for reproducing a default image when the judging means judges that the selected presentation data is not one of the s pieces of presentation data, wherein when the judging means judges that the selected presentation data is not one of the s pieces of presentation data, the receiving means waits until the time when the selected presentation data is broadcast, receives the selected presentation data when the time is reached, and allows the reproducing means to reproduce the received link-target presentation data.

4. The terminal apparatus of claim 1, wherein the presenting means includes:

a link information displaying unit for displaying, on one screen, t pieces of link information in relation to t pieces out of the detected pieces of link-target presentation data; and a determination operation detecting unit for detecting a determination operation performed on one of the displayed t pieces of link information, wherein the pre-reading means receives beforehand the t pieces of presentation data among the detected link-target presentation data and t pieces of navigation data corresponding to the t pieces of presentation data, and stores the received data in the cache means.

5. The terminal apparatus of claim 4, wherein each piece of the link information is represented by an icon.

6. The terminal apparatus of claim 1, wherein the presenting means includes:

a link information displaying unit for displaying, on one screen, t pieces of link information in relation to t pieces of presentation data among the detected link-target pieces of presentation data;

a setting unit for setting one of the displayed t pieces of link information to a focused state and the other pieces of link information to a normal state; and a focus changing unit for, in accordance with an operation by the operator, changing the piece of link information in the focused state to a normal state and setting another one of the displayed t pieces of link information to the focused state, wherein when the setting unit sets a piece of link information to the focused state, the pre-reading means allows the receiving means to receive at least one piece of presentation data corresponding to the piece of link information in the focused state and to store the received piece of presentation data in the cache means.

7. The terminal apparatus of claim 6, wherein each piece of the link information is represented by an icon.

8. The terminal apparatus of claim 7, wherein the pre-reading means includes a weighting means for, when the setting unit sets a piece of link information to the focused state, assigning the highest weight to an icon representing the piece of link information in the focused state and assigning weights lower than the highest weight to the other icons with grades in accordance with positions relative to the icon with the highest weight, wherein
the receiving means receives s pieces of presentation data and n pieces of navigation data one by one in descending order of weights assigned to icons corresponding thereto, and stores the received data in the cache means.

9. The terminal apparatus of claim 1 further comprising:
hit pair judging means for, when the operator selects one among the presented link-target presentation data and when the selected presentation data is one of the s pieces of presentation data, judges the selected presentation data and a piece of navigation data corresponding thereto as a hit pair indicating that the selected presentation data has hit an expected one,
mark assigning means for assigning a mark; which indicates a hit, to the hit pair; and
area freeing means for freeing areas in the cache means allocated to pieces of presentation data and pieces of navigation data other than the hit pair to create unallocated space in the cache means.

10. The terminal apparatus of claim 1, wherein
when some of the link-target pieces of presentation data detected by the presenting means have been stored in the cache means, the pre-reading means allows the receiving means to receive beforehand the s pieces of presentation data, which exclude the pieces of presentation data stored in the cache means, and the t pieces of navigation data corresponding to the s pieces of presentation data.

11. The terminal apparatus of claim 1, wherein
the pre-reading means instructs the receiving means to receive the s pieces of presentation data and the corresponding t pieces of navigation data one by one in a predetermined order,
the terminal apparatus further comprising:
data size judging means for judging whether capacity of a free area in the cache means exceeds a data size of a received piece of presentation data and corresponding navigation data; and
writing means for writing the received piece of presentation data and corresponding navigation data onto the free area when the data size judging means judges that the capacity of the free area exceeds the data size, wherein
when a piece of presentation data and corresponding navigation data are written, the receiving means receives (a) a piece of presentation data with a rank next to a rank of the written piece of presentation data and (b) a piece of navigation data corresponding to the next-rank presentation data.

12. The terminal apparatus of claim 11, wherein
each piece of presentation data contains a video stream including a plurality of frames,
the data size judging means includes
a frame size judging unit for, when the data size judging means judges that the capacity of the free area in the cache means does not exceed the data size of the received piece of presentation data and corresponding navigation data, judging whether the capacity of the free area in the cache means exceeds a data size of a frame of the received piece of presentation data and corresponding navigation data, wherein
the writing means includes:
a frame writing unit for writing the frame of the received piece of presentation data and corresponding navigation data onto the free area when the frame size judging unit judges that the capacity of the free area exceeds the data size thereof.

13. The terminal apparatus of claim 12, wherein
the data size judging means further includes:
an oldest presentation data detecting unit for, out of pieces of presentation data stored in the cache means, detecting a piece of oldest presentation data when the frame size judging unit judges that the capacity of the free area in the cache means does not exceed the data size of the frame of the piece of presentation data and corresponding navigation data, wherein
the frame writing unit writes the frame of the received piece of presentation data and corresponding navigation data onto an area in which the piece of oldest presentation data and a piece of navigation data corresponding thereto are stored.

14. The terminal apparatus of claim 1, wherein
the pre-reading means includes
a statistics value storing unit for storing a statistics value that indicates a number of times the determination operation has been performed in the past for each piece of presentation data, wherein
the receiving means assigns a rank to each of the s pieces of presentation data and the t pieces of navigation data corresponding thereto, in accordance with the statistics value thereof, and receives the s pieces of presentation data and the corresponding t pieces of navigation data one by one in order of the ranks thereof.

15. The terminal apparatus of claim 14, wherein
the pre-reading means includes
an incrementing unit for incrementing, by one, a statistics value for a piece of presentation data each time the determination operation is performed on the piece of presentation data.

16. The terminal apparatus of claim 1, wherein
the detecting means includes
a detecting unit for detecting rank information from the piece of navigation data corresponding to the piece of presentation data reproduced by the reproducing means, the rank information showing ranks of each of the plurality of pieces of link-target presentation data specified by the piece of navigation data, wherein
the receiving means assigns, in accordance with the rank information, a different rank to each of the s pieces of presentation data and the t pieces of navigation data corresponding thereto, and receives the s pieces of presentation data and the t pieces of navigation data one by one in order of the assigned ranks.

17. A terminal apparatus for interactively switching pieces of presentation data in a system which repeatedly broadcasts m pieces of presentation data and n pieces of navigation data corresponding to the m pieces of presentation data, wherein m and n are each an integer of "1" or higher, the terminal apparatus comprising:
receiving means for receiving one of the m pieces of presentation data;
reproducing means for reproducing the received piece of presentation data;

presenting means for analyzing a piece of navigation data corresponding to the reproduced presentation data to detect a plurality of pieces of link-target presentation data specified by the corresponding piece of navigation data and presenting the detected link-target presentation data to an operator, the plurality of link-target pieces of presentation data being among the m pieces of presentation data excluding the reproduced presentation data;

pre-reading means for allowing the receiving means to receive beforehand t pieces of navigation data corresponding to s pieces of presentation data among the plurality of pieces of link-target presentation data, s being an integer satisfying $1 \leq s \leq m$, and t an integer satisfying $1 \leq t \leq n$;

cache means for storing the pre-received t pieces of navigation data; and reading means for, when the operator selects one among the presented plurality of pieces of link-target presentation data and when the selected presentation data corresponds to one of the t pieces of navigation data stored in the cache means, reading the corresponding piece of navigation data from the cache means and allowing the presenting means to present a plurality of pieces of link-target presentation data specified by the read navigation data.

18. The terminal apparatus of claim 17 further comprising:

judging means for, when the operator selects one among the presented link-target pieces of presentation data, judging whether the selected presentation data corresponds to one of the t pieces of navigation data stored in the cache means, wherein when the judging means judges that the selected presentation data does not correspond to one of the t pieces of navigation data stored in the cache means, the receiving means waits until a time when a piece of navigation data corresponding to the selected presentation data is broadcast, receives the corresponding navigation data when the broadcast time is reached, and allows the presenting means to present a plurality of pieces of link-target presentation data specified by the received navigation data, and when the judging means judges that the selected presentation data corresponds to one of the t pieces of navigation data stored in the cache means, the reading means reads the corresponding pieces of navigation data from the cache means before the broadcast time is reached, and allows the presenting means to present a plurality of pieces of link-target presentation data specified by the read navigation data.

19. The terminal apparatus of claim 18 further comprising:

default image reproducing means for reproducing a default image when the judging means judges that the selected presentation data does not correspond to one of the t pieces of navigation data stored in the cache means, wherein when the judging means judges that the selected presentation data does not correspond to one of the t pieces of navigation data stored in the cache means, the receiving means waits until the time when the piece of navigation data corresponding to the selected presentation data is broadcast, receives the corresponding navigation data when the time is reached, and allows the presenting means to present the plurality of pieces of link-target presentation data specified by the received navigation data.

20. The terminal apparatus of claim 17, wherein the presenting means includes:

a link information displaying unit for displaying, on one screen, t pieces of link information in relation to t pieces out of the detected pieces of link-target presentation data; and a determination operation detecting unit for detecting a determination operation performed on one of the displayed t pieces of link information, wherein the pre-reading means receives beforehand t pieces of navigation data corresponding to the t pieces of presentation data among the detected link-target presentation data, and stores the received navigation data in the cache means.

21. The terminal apparatus of claim 20, wherein each piece of the link information is represented by an icon.

22. The terminal apparatus of claim 17, wherein the presenting means includes:

a link information displaying unit for displaying, on one screen, t pieces of link information in relation to t pieces of presentation data among the detected link-target pieces of presentation data;

a setting unit for setting one of the displayed t pieces of link information to a focused state and the other pieces of link information to a normal state; and a focus changing unit for, in accordance with an operation by the operator, changing the piece of link information in the focused state to a normal state and setting another one of the displayed t pieces of link information to the focused state, wherein when the setting unit sets a piece of link information to the focused state, the pre-reading means allows the receiving means to receive at least one piece of navigation data corresponding to the piece of link information in the focused state and to store the received piece of navigation data in the cache means.

23. The terminal apparatus of claim 22, wherein each piece of the link information is represented by an icon.

24. The terminal apparatus of claim 23, wherein the pre-reading means includes a weighting means for, when the setting unit sets a piece of link information to the focused state, assigning the highest weight to an icon representing the piece of link information in the focused state and assigning weights lower than the highest weight to the other icons with grades in accordance with positions relative to the icon with the highest weight, wherein the receiving means receives n pieces in navigation data corresponding to s pieces of presentation data, one by one in descending order of weights assigned to icons corresponding the s pieces of presentation data, and stores the received navigation data in the cache means.

25. The terminal apparatus of claim 17 further comprising:

hit pair judging means for, when the operator selects one among the presented link-target presentation data and when the selected presentation data corresponds to one of the t pieces of navigation data, judges a piece of navigation data corresponding to the selected presentation data as a hit pair indicating that the selected presentation data has hit an expected one;

mark assigning means for assigning a mark, which indicates a hit, to the hit pair; and area freeing means for freeing areas in the cache means allocated to pieces of navigation data other than the hit pair to create unallocated space in the cache means.

26. The terminal apparatus of claim 17, wherein
when some of the link-target pieces of presentation data detected by the presenting means corresponds to the navigation data stored in the cache means, the pre-reading means allows the receiving means to receive beforehand the t pieces of navigation data that exclude the navigation data stored in the cache means and correspond to the link-target pieces of presentation data detected by the presenting means.

27. The terminal apparatus of claim 17, wherein
the pre-reading means instructs the receiving means to receive the t pieces of navigation data one by one in a predetermined order,
the terminal apparatus further comprising:
data size judging means for judging whether capacity of a free area in the cache means exceeds a data size of a received piece of navigation data; and
writing means for writing the received piece of navigation data onto the free area when the data size judging means judges that the capacity of the free area exceeds the data size, wherein
when a piece of navigation data is written, the receiving means receives a piece of navigation data with a rank next to a rank of the written piece of navigation data.

28. The terminal apparatus of claim 17, wherein
the pre-reading means includes
a statistics value storing unit for storing a statistics value that indicates a number of times the determination operation has been performed in the past for each piece of presentation data, wherein
the receiving means assigns a rank to each of the t pieces of navigation data in accordance with the statistics value thereof, and receives the t pieces of navigation data one by one in order of the ranks thereof.

29. The terminal apparatus of claim 28, wherein
the pre-reading means includes
an incrementing unit for incrementing, by one, a statistics value for a piece of presentation data each time the determination operation is performed on the piece of presentation data.

30. The terminal apparatus of claim 17, wherein
the detecting means includes
a detecting unit for detecting rank information from the piece of navigation data corresponding to the piece of presentation data reproduced by the reproducing means, the rank information showing ranks of each of the plurality of pieces of link-target presentation data specified by the piece of navigation data, wherein
the receiving means assigns, in accordance with the rank information, a different rank to each of the t pieces of navigation data corresponding to the s pieces of presentation data, and receives the t pieces of navigation data one by one in order of the assigned ranks.

31. A reception method for allowing a computer having a cache memory to interactively switch pieces of presentation data in a system which repeatedly broadcasts m pieces of presentation data and n pieces of navigation data corresponding to the m pieces of presentation data, wherein m and n are each an integer of "1" or higher, the reception method comprising:

a receiving step for receiving one of the m pieces of presentation data;

a reproducing step for reproducing the received piece of presentation data;

a presenting step for analyzing a piece of navigation data corresponding to the reproduced presentation data to detect a plurality of pieces of link-target presentation data specified by the corresponding piece of navigation data and presenting the detected link-target presentation data to an operator, the plurality of link-target pieces of presentation data being among the m pieces of presentation data excluding the reproduced presentation data;

a pre-reading step for allowing the receiving step to receive beforehand t pieces of navigation data corresponding to s pieces of presentation data among the plurality of pieces of link-target presentation data, and storing the pre-received t pieces of navigation data in the cache memory, s being an integer satisfying $1 \leq s \leq m$ and t an integer satisfying $1 \leq t \leq n$; and a reading step for, when the operator selects one among the presented plurality of pieces of link-target presentation data and when the selected presentation data corresponds to one of the t pieces of navigation data stored in the cache memory, reading the corresponding piece of navigation data from the cache memory and allowing the presenting step to present a plurality of pieces of link-target presentation data specified by the read navigation data.

32. The reception method of claim 31 further comprising:
a judging step for, when the operator selects one among the presented link-target pieces of presentation data, judging whether the selected presentation data corresponds to one of the t pieces of navigation data stored in the cache memory, wherein
when the judging step judges that the selected presentation data does not correspond to one of the t pieces of navigation data stored in the cache memory, the receiving step waits until a time when a piece of navigation data corresponding to the selected presentation data is broadcast, receives the corresponding navigation data when the time is reached, and allows the presenting step to present a plurality of pieces of link-target presentation data specified by the received navigation data, and
when the judging step judges that the selected presentation data corresponds to one of the t pieces of navigation data stored in the cache step, the reading steps reads the corresponding piece of navigation data from the cache step before the broadcast time is reached, and allows the presenting step to present a plurality of pieces of link-target presentation data specified by the read navigation data.

33. The reception method of claim 32 further comprising:
a default image reproducing step for reproducing a default image when the judging step judges that the selected presentation data does not correspond to one of the t pieces of navigation data stored in the cache memory, wherein
when the judging step judges that the selected presentation data does not correspond to one of the t pieces of navigation data stored in the cache memory, the receiving step waits until the time when the piece of navigation data corresponding to the selected presentation data is broadcast, receives the corresponding navigation data when the time is reached, and allows the presenting step to present the plurality of pieces of link-target presentation data specified by the received navigation data.

34. The reception method of claim 31, wherein the presenting step includes:
   a link information displaying sub-step for displaying, on one screen, t pieces of link information in relation to t pieces out of the detected pieces of link-target presentation data; and
   a determination operation detecting sub-step for detecting a determination operation performed on one of the displayed t pieces of link information, wherein the pre-reading step receives beforehand t pieces of navigation data corresponding to the t pieces of presentation data among the detected link-target presentation data, and stores the received navigation data in the cache memory.

35. The reception method of claim 34, wherein each piece of the link information is represented by an icon.

36. The reception method of claim 31, wherein the presenting step includes:
   a link information displaying sub-step for displaying, on one screen, t pieces of link information in relation to t pieces of presentation data among the detected link-target pieces of presentation data;
   a setting sub-step for setting one of the displayed t pieces of link information to a focused state and the other pieces of link information to a normal state; and
   a focus changing sub-step for, in accordance with an operation by the operator, changing the piece of link information in the focused state to a normal state and setting another one of the displayed t pieces of link information to the focused state, wherein
      when the setting sub-step sets a piece of link information to the focused state, the pre-reading step allows the receiving step to receive at least one piece of navigation data corresponding to the piece of link information in the focused state and to store the received piece of navigation data in the cache memory.

37. The reception method of claim 36, wherein each piece of the link information is represented by an icon.

38. The reception method of claim 37, wherein the pre-reading step includes
   a weighting sub-step for, when the setting sub-step sets a piece of link information to the focused state, assigning the highest weight to an icon representing the piece of link information in the focused state and assigning weights lower than the highest weight to the other icons with grades in accordance with positions relative to the icon with the highest weight, wherein
      the receiving step receives n pieces of navigation data corresponding to s pieces of presentation data, one by one in descending order of weights assigned to icons corresponding the s pieces of presentation data, and stores the received navigation data in the cache memory.

39. The reception method of claim 31 further comprising:
   a hit pair judging step for, when the operator selects one among the presented link-target presentation data and when the selected presentation data corresponds to one of the t pieces of navigation data, judges a piece of navigation data corresponding to the selected presentation data as a hit pair indicating that the selected presentation data has hit an expected one;
   a mark assigning step for assigning a mark, which indicates a hit, to the hit pair; and
   an area freeing step for freeing areas in the cache memory allocated to pieces of navigation data other than the hit pair to create unallocated space in the cache memory.

40. The reception method of claim 31, wherein when some of the link-target pieces of presentation data detected by the presenting step correspond to the navigation data stored in the cache memory, the pre-reading step allows the receiving step to receive beforehand the t pieces of navigation data that exclude the navigation data stored in the cache memory and correspond to the link-target pieces of presentation data detected by the presenting step.

41. The reception method of claim 31, wherein the pre-reading step instructs the receiving step to receive the t pieces of navigation data one by one in a predetermined order,
the reception method further comprising:
   a data size judging step for judging whether capacity of a free area in the cache memory exceeds a data size of a received piece of navigation data; and
   a writing step for writing the received piece of navigation data onto the free area when the data size judging step judges that the capacity of the free area exceeds the data size, wherein
      when a piece of navigation data is written, the receiving step receives a piece of navigation data with a rank next to a rank of the written piece of navigation data.

42. The reception method of claim 31, wherein the computer includes
   a statistics value storing unit for storing a statistics value that indicates a number of times the determination operation has been performed in the past for each piece of presentation data, wherein
      the receiving step assigns a rank to each of the t pieces of navigation data in accordance with the statistics value thereof, and receives the t pieces of navigation data one by one in order of the ranks thereof.

43. The reception method of claim 42, wherein the pre-reading step includes
   an incrementing sub-step for incrementing, by one, a statistics value for a piece of presentation data each time the determination operation is performed on the piece of presentation data.

44. The reception method of claim 31, wherein the detecting step includes
   a detecting sub-step for detecting rank information from the piece of navigation data corresponding to the piece of presentation data reproduced by the reproducing step, the rank information showing ranks of each of the plurality of pieces of link-target presentation data specified by the piece of navigation data, wherein
      the receiving step assigns, in accordance with the rank information, a different rank to each of the t pieces of navigation data corresponding to the s pieces of presentation data, and receives the t pieces of navigation data one by one in order of the assigned ranks.

45. A computer-readable recording medium that records a program for allowing a computer having a cache memory to interactively switch pieces of presentation data in a system which repeatedly broadcasts m pieces of presentation data and n pieces of navigation data corresponding to the m pieces of presentation data, wherein m and n are each an integer of "1" or higher, the program allows the computer to execute:

a receiving step for receiving one of the m pieces of presentation data;

a reproducing step for reproducing the received piece of presentation data;

a presenting step for analyzing a piece of navigation data corresponding to the reproduced presentation data to detect a plurality of pieces of link-target presentation data specified by the corresponding piece of navigation data and presenting the detected link-target presentation data to an operator, the plurality of link-target pieces of presentation data being among the m pieces of presentation data excluding the reproduced presentation data;

a pre-reading step for allowing the receiving step to receive beforehand t pieces of navigation data corresponding to s pieces of presentation data among the plurality of pieces of link-target presentation data, and storing the pre-received t pieces of navigation data in the cache memory, s being an integer satisfying $1 \leq s \leq m$, and t an integer satisfying $1 \leq t \leq n$; and a reading step for, when the operator selects one among the presented plurality of pieces of link-target presentation data and when the selected presentation data corresponds to one of the t pieces of navigation data stored in the cache memory, reading the corresponding piece of navigation data from the cache memory and allowing the presenting step to present a plurality of pieces of link-target presentation data specified by the read navigation data.

46. The computer-readable recording medium of claim 45, wherein the program further allows the computer to execute a judging step for, when the operator selects one among the presented link-target pieces of presentation data, judging whether the selected presentation data corresponds to one of the t pieces of navigation data stored in the cache memory, wherein when the judging step judges that the selected presentation data does not correspond to one of the t pieces of navigation data stored in the cache memory, the receiving step waits until a time when a piece of navigation data corresponding to the selected presentation data is broadcast, receives the corresponding navigation data when the time is reached, and allows the presenting step to present a plurality of pieces of link-target presentation data specified by the received navigation data, and when the judging step judges that the selected presentation data corresponds to one of the t pieces of navigation data stored in the cache step, the reading step reads the corresponding piece of navigation data from the cache step before the broadcast time is reached, and allows the presenting step to present a plurality of pieces of link-target presentation data specified by the read navigation data.

47. The computer-readable recording medium of claim 46, wherein the program further allows the computer to execute a default image reproducing step for reproducing a default image when the judging step judges that the selected presentation data does not correspond to one of the t pieces of navigation data stored in the cache memory, wherein when the judging step judges that the selected presentation data does not correspond to one of the t pieces of navigation data stored in the cache memory, the receiving step waits until the time when the piece of navigation data corresponding to the selected presentation data is broadcast, receives the corresponding navigation data when the time is reached, and allows the presenting step to present the plurality of pieces of link-target presentation data specified by the received navigation data.

48. The computer-readable recording medium of claim 45, wherein the presenting step includes:

a link information displaying sub-step for displaying, on one screen, t pieces of link information in relation to t pieces out of the detected pieces of link-target presentation data; and a determination operation detecting sub-step for detecting a determination operation performed on one of the displayed t pieces of link information, wherein the pre-reading step receives beforehand t pieces of navigation data corresponding to the t pieces of presentation data among the detected link-target presentation data, and stores the received navigation data in the cache memory.

49. The computer-readable recording medium of claim 48, wherein each piece of the link information is represented by an icon.

50. The computer-readable recording medium of claim 45, wherein the presenting step includes:

a link information displaying sub-step for displaying, on one screen, t pieces of link information in relation to t pieces of presentation data among the detected link-target pieces of presentation data;

a setting sub-step for setting one of the displayed t pieces of link information to a focused state and the other pieces of link information to a normal state; and a focus changing sub-step for, in accordance with an operation by the operator, changing the piece of link information in the focused state to a normal state and setting another one of the displayed t pieces of link information to the focused state, wherein when the setting sub-step sets a piece of link information to the focused state, the pre-reading step allows the receiving step to receive at least one piece of navigation data corresponding to the piece of link information in the focused state and to store the received piece of navigation data in the cache memory.

51. The computer-readable recording medium of claim 50, wherein each piece of the link information is represented by an icon.

52. The computer-readable recording medium of claim 51, wherein the pre-reading step includes a weighting sub-step for, when the setting sub-step sets a piece of link information to the focused state, assigning the highest weight to an icon representing the piece of link information in the focused state and assigning weights lower than the highest weight to the other icons with grades in accordance with positions relating to the icon with the highest weight, wherein the receiving step receives n pieces of navigation data corresponding to s pieces of presentation data, one by one in descending order of weights assigned to icons corresponding the s pieces of presentation data, and stores the received navigation data in the cache memory.

53. The computer-readable recording medium of claim 45, wherein the program further allows the computer to execute:

a hit pair judging step for, when the operator selects one among the presented link-target presentation data and when the selected presentation data corresponds to one of the t pieces of navigation data, judges a piece of navigation data corresponding to the selected presentation data as a hit pair indicating that the selected presentation data has hit an expected one;

a mark assigning step for assigning a mark, which indicates a hit, to the hit pair; and an area freeing step for freeing areas in the cache memory allocated to pieces of navigation data other than the hit pair to create unallocated space in the cache memory.

54. The computer-readable recording medium of claim 45, wherein when some of the link-target pieces of presentation data detected by the presenting step correspond to the navigation data stored in the cache memory, the pre-reading step allows the receiving step to receive beforehand the t pieces of navigation data that exclude the navigation data stored in the cache memory and correspond to the link-target pieces of presentation data detected by the presenting step.

55. The computer-readable recording medium of claim 45, wherein the pre-reading step instructs the receiving step to receive the t pieces of navigation data one by one in a predetermined order, the reception method further comprising:

a data size judging step for judging whether capacity of a free area in the cache memory exceeds a data size of a received piece of navigation data; and a writing step for writing the received piece of navigation data onto the free area when the data size judging step judges that the capacity of the free area exceeds the data size, wherein when a piece of navigation data is written, the receiving step receives a piece of navigation data with a rank next to a rank of the written piece of navigation data.

56. The computer-readable recording medium of claim 45, wherein the computer includes a statistics value storing unit for storing a statistics value that indicates a number of times the determination operation has been performed in the past for each piece of presentation data, and the receiving step assigns a rank to each of the t pieces of navigation data in accordance with the statistics value thereof, and receives the t pieces of navigation data one by one in order of the ranks thereof.

57. The computer-readable recording medium of claim 56, wherein the pre-reading step includes an incrementing sub-step for incrementing, by one, a statistics value for a piece of presentation data each time the determination operation is performed on the piece of presentation data.

58. The computer-readable recording medium of claim 45, wherein the detecting step includes a detecting sub-step for detecting rank information from the piece of navigation data corresponding to the piece of presentation data reproduced by the reproducing step, the rank information showing ranks of each of the plurality of pieces of link-target presentation data specified by the piece of navigation data, wherein the receiving step assigns, in accordance with the rank information, a different rank to each of the t pieces of navigation data corresponding to the s pieces of presentation data, and receives the t pieces of navigation data one by one in order of the assigned ranks.

* * * * *